(12) United States Patent
Gross

(10) Patent No.: US 6,682,678 B2
(45) Date of Patent: Jan. 27, 2004

(54) METHOD OF MAKING TRANSLATIONAL SPOUT CLOSURE FOR A CONTAINER

(75) Inventor: Richard A. Gross, Oconomowoc, WI (US)

(73) Assignee: Arrow Innovations, LLC, Oconomowoc, WI (US)

( * ) Notice: Subject to any disclaimer, the term of this patent is extended or adjusted under 35 U.S.C. 154(b) by 0 days.

(21) Appl. No.: 10/066,970

(22) Filed: Feb. 4, 2002

(65) Prior Publication Data
US 2003/0146540 A1 Aug. 7, 2003

(51) Int. Cl.$^7$ .............................................. B29C 45/14
(52) U.S. Cl. ....................... 264/242; 264/255; 264/268; 264/328.7; 222/522
(58) Field of Search ................................ 264/242, 255, 264/267, 268, 273, 238, 328.7; 222/519–525

(56) References Cited

U.S. PATENT DOCUMENTS

| | | | | |
|---|---|---|---|---|
| 2,347,737 A | * | 5/1944 | Fuller | 264/155 |
| 3,013,308 A | * | 12/1961 | Armour | 264/328.8 |
| 3,685,933 A | * | 8/1972 | Schneider | 425/577 |
| 3,746,489 A | * | 7/1973 | Rizzi et al. | 425/205 |
| 3,832,100 A | | 8/1974 | Hehl | |
| 4,823,994 A | * | 4/1989 | Laauwe | 222/521 |
| 5,200,132 A | * | 4/1993 | Shfaram et al. | 264/328.8 |
| 5,472,120 A | | 12/1995 | Stebick et al. | |
| 5,705,112 A | | 1/1998 | Gram | |
| 5,743,444 A | | 4/1998 | Beck et al. | |
| 5,772,076 A | * | 6/1998 | Juk et al. | 222/153.06 |
| 5,922,263 A | * | 7/1999 | Endo et al. | 264/255 |
| 5,975,381 A | * | 11/1999 | Revenu | 264/328.7 |
| 5,989,469 A | * | 11/1999 | Dirr | 264/255 |
| 5,992,710 A | * | 11/1999 | Lovell et al. | 222/525 |
| 6,024,256 A | | 2/2000 | Beck et al. | |
| D423,358 S | | 4/2000 | Kreiseder | |
| D424,442 S | | 5/2000 | Kreiseder | |
| 6,073,810 A | | 6/2000 | Long, Jr. | |
| D435,793 S | | 1/2001 | Kreiseder | |

FOREIGN PATENT DOCUMENTS

| | | |
|---|---|---|
| DE | 4224936 | 3/1993 |
| FR | 2015660 | 4/1970 |
| FR | 2785222 | 5/2000 |
| JP | 61047223 | 3/1986 |
| WO | WO 91/01213 | 2/1991 |
| WO | WO 98/35808 | 8/1998 |
| WO | WO 98/38021 | 9/1998 |
| WO | WO 00/73040 | 12/2000 |

* cited by examiner

Primary Examiner—Jill L. Heitbrink
(74) Attorney, Agent, or Firm—Boyle, Fredrickson, Newholm, Stein & Gratz, S.C.

(57) ABSTRACT

A method of forming a two-piece assembly, such as a container closure assembly, in which a spout member is movable on a chimney section defined by a chimney member, which is adapted to be engaged with the neck of a container for dispensing the container contents. The spout member is formed in a first mold cavity, and includes a side wall and an end wall with an opening. The first cavity is defined by first and second mold sections, and the second mold section is removed after the spout member is formed. The second mold section is then replaced by a third mold section, which cooperates with the first mold section and the spout member to form a second cavity having a shape corresponding to the chimney member. The second mold section and the side wall and end wall of the spout member cooperate to form the chimney member with a side wall and end wall which overlie the spout member side wall and end wall, respectively. The chimney member is formed with an opening, and the spout member is movable relative to the chimney member between open and closed positions. The spout member and the opening and the chimney member opening communicate when the spout member is in its open position, to enable dispensing of the container contents. The spout member and the chimney member are formed with a stop arrangement, which functions to limit movement of the spout member relative to the chimney member.

37 Claims, 17 Drawing Sheets

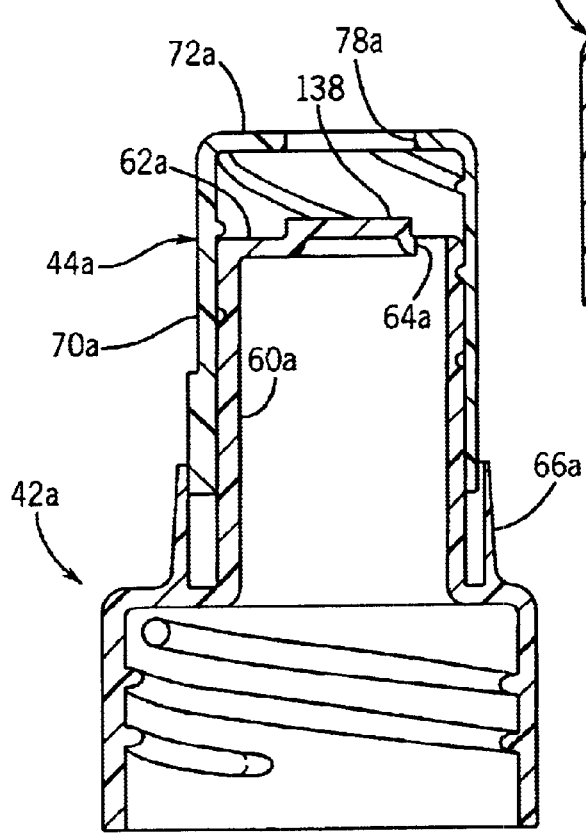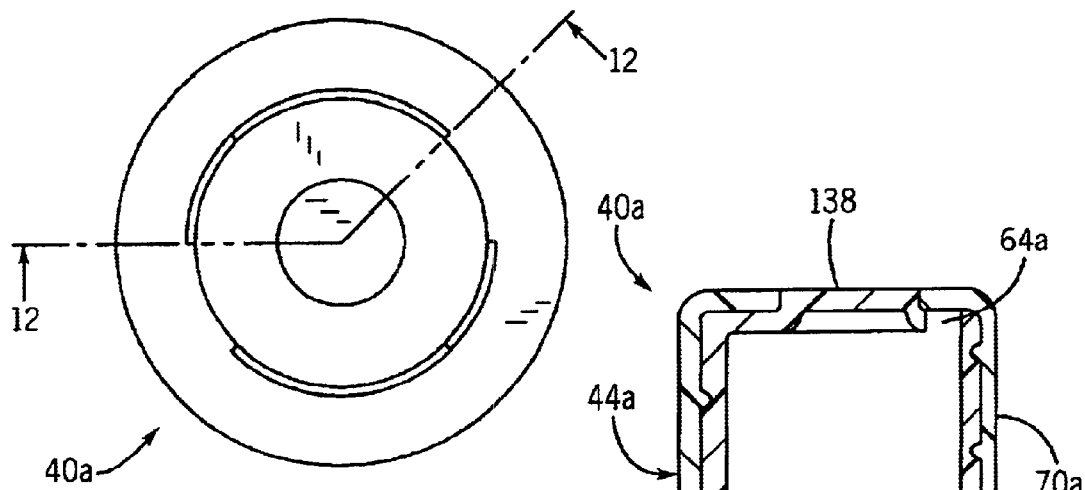
FIG. 11
FIG. 12
FIG. 13

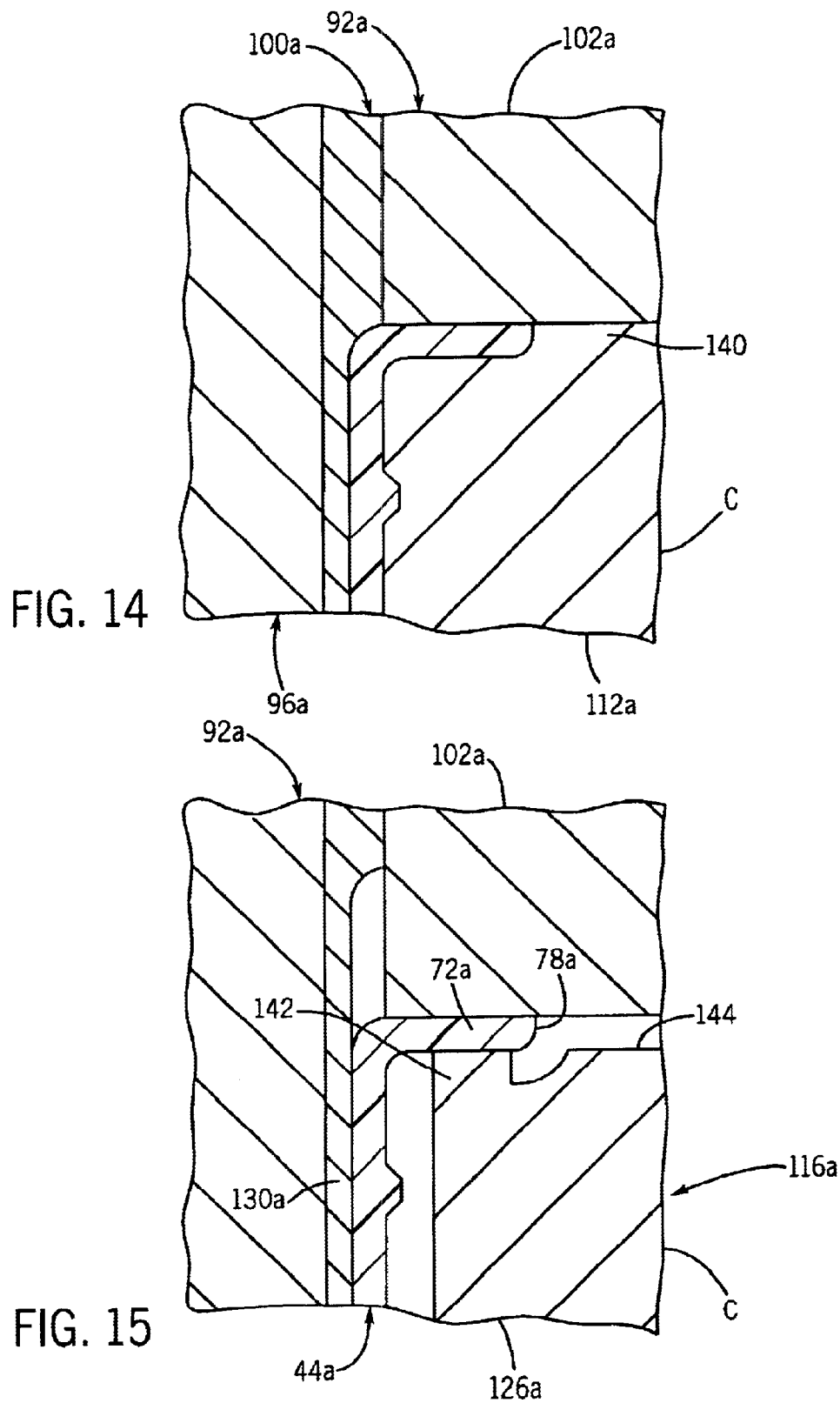

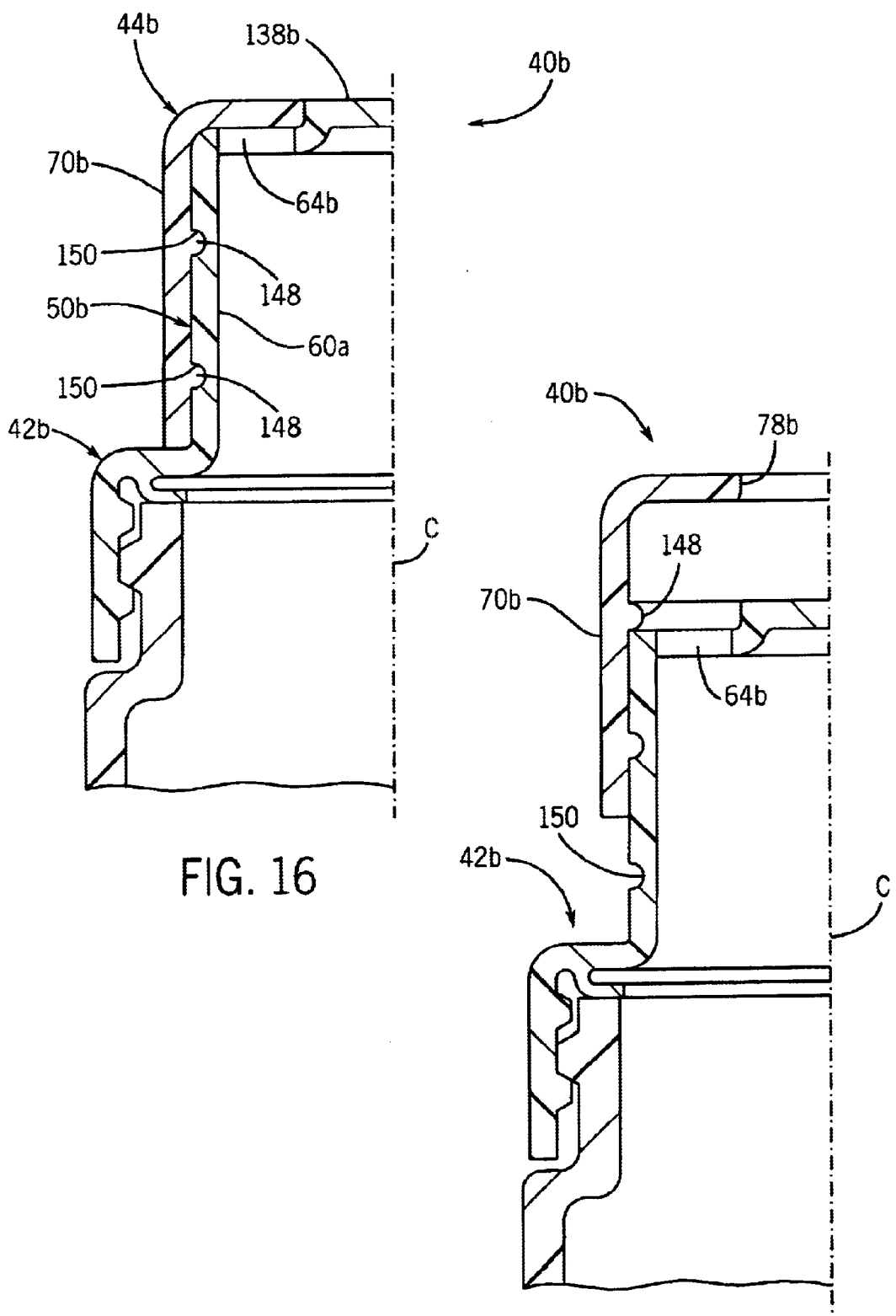

METHOD OF MAKING TRANSLATIONAL SPOUT CLOSURE FOR A CONTAINER

BACKGROUND AND SUMMARY OF THE INVENTION

This invention relates to a container closure assembly, and more particularly to a spout-type closure assembly having a movable spout member for selectively opening and closing the container closure assembly.

A spout-type closure assembly is typically employed for dispensing flowable contents from the interior of a container. The container typically includes a neck, and the closure assembly includes a base section which is engageable with the container neck to mount the closure assembly to the container. In a typical construction, a chimney member extends from the base section, and includes one or more openings. A spout member is movably mounted to the chimney member, and also defines one or more openings. The spout member is movable relative to the chimney member between a closed position in which both the spout member openings and the chimney member openings are closed, and an open position in which communication is established between the spout member openings and the chimney member openings, for enabling the container contents to be dispensed through the openings of the chimney member and the spout member. The spout member and the chimney member are formed in separate molding operations, and the spout member and chimney member are then assembled together in a specialized machine designed specifically for this purpose. While this type of spout-type closure assembly functions satisfactorily, it is disadvantageous in that two separate molds and molding operations are required in order to form the components of the closure assembly. Further, additional equipment and/or labor are required in order to handle and assemble the spout members and the chimney members. These factors combine to provide a relatively high cost of manufacture, based on the required tooling, equipment and labor, as well as cycle times involved in separate molding and assembly operations.

It is an object of the present invention to provide a spout-type dispensing closure assembly in which the components of the closure assembly are formed together, to eliminate the handling and equipment required to assemble separate components together in a separate operation. Another object of the invention is to provide such a spout-type dispensing closure assembly which involves use of a reduced number of molds required to form the components of the closure assembly, so as to reduce tooling costs. A further object of the invention is to provide such a spout-type dispensing closure assembly which is capable of being formed in a sequential molding process, which eliminates handling of the components for assembly. A still further object of the invention is to provide such a spout-type dispensing closure assembly which is relatively simple in its components and which operates in a similar manner to prior art dispensing closure assemblies, yet which is capable of being formed in an efficient, cost-effective manner. Yet another object of the invention is to provide such a spout-type dispensing closure assembly which is capable of incorporating a tamper evident feature to provide an indication to the user as to movement of the spout member away from its initial closed position.

In accordance with the invention, a spout-type dispensing closure assembly generally includes a chimney member having a base section adapted for engagement with the neck of a container, and a chimney section extending outwardly from the base section. The chimney section includes a side wall and an end wall which cooperate to define an internal passage or cavity adapted to communicate with the interior of the container when the base section of the chimney member is engaged with the container neck. The chimney member further includes at least one opening, preferably formed in its end wall, which communicates with the internal cavity of the chimney section. A spout member is engaged with the chimney member, and is movable between an open position for providing discharge of the container contents through the chimney section opening, and a closed position for closing the chimney section opening. The spout member is preferably formed so as to define a side wall located adjacent the chimney section side wall, and an end wall interconnected with the spout member side wall. The spout member side wall and end wall cooperate to define an internal passage or cavity within which the chimney section of the chimney member is located. The spout member also includes at least one opening, which is preferably formed in the spout member and wall. The spout member opening communicates with the chimney member opening when the spout member is in its open position, so as to enable the container contents to be discharged through the chimney member and the spout member. The spout member end wall and the chimney section end wall include mating plug-type engagement structure, which is operable to isolate the spout member openings from the chimney section openings to prevent discharge of the container contents when the spout member is in its closed position.

The spout member and the chimney member include stop structure which is operable to place the spout member in its open and closed positions. In one form, the spout member is axially movable on the chimney section for movement between its open and closed positions, and the stop structure includes a ring and groove arrangement interposed between the spout member side wall and the chimney section side wall. The ring and groove arrangement is configured to releasably maintain the spout member in either its open position or its closed position. In another form, the spout member is rotatably mounted to the chimney member, such that rotation of the spout member is operable to move the spout member between its open and closed positions. In a preferred form, helical mating engagement structure is interposed between the spout member side wall and the chimney section side wall. The helical engagement structure provides axial inward and outward movement of the spout member relative to the chimney section when the spout member is rotated relative to the chimney section, for moving the spout member between its open and closed positions. In this embodiment, a stop member and recess arrangement is interposed between the spout member and the chimney member for limiting the range of rotatable movement of the spout member relative to the chimney member, to limit axial outward movement of the spout member when the spout member is rotated relative to the chimney member to its open position.

The components of the container closure assembly of the present invention are preferably formed in a molding process in which the spout member is initially formed in a first mold cavity defined by first and second mold sections. Subsequent to its formation, the spout member remains in engagement with the first mold section, and the second mold section is removed and replaced with a third mold section. The third mold section is adapted to cooperate with the first mold section and with the spout member so as to form a second cavity configured to form the chimney member.

Inner surface areas of the spout member side wall and end wall define outer surfaces of the second cavity within which the chimney section of the chimney member is formed. In this manner, the chimney section of the chimney member is formed inside the spout member, such that the end wall of the chimney section is formed by and engages the spout member end wall, and the side wall of the chimney section is formed by and engages the spout member side wall. The first and second mold sections are configured to define the one or more openings in the spout member end wall, as well as closure structure associated with the spout member end wall. The third mold section is configured to cooperate with the closure structure of the spout member end wall, such that the opening in the chimney section end wall is formed about the closure structure of the spout member end wall. In addition, the third mold section includes an end surface which is spaced from opening-forming structure defined by the first mold section, which remains within the openings formed in the spout member end wall. The end surface of the third mold section is thus operable to form an end wall space in the second cavity, which receives moldable material injected into the second cavity to form the chimney member end wall so as to enclose the openings in the spout member end wall. Alternatively, the closure structure may be associated with the chimney section end wall, and is formed in an end wall portion of the second mold cavity within the opening in the spout member and wall.

The stop structure, which defines the range of movement of the spout member between its open and closed positions, is preferably formed integrally with the chimney member and the spout member side wall in the molding process. In the stop member and recess embodiment, the stop member is formed integrally with the spout member side wall. The stop member may be formed using a sleeve-type insert associated with the first mold section, which is an extendible and retractable portion that is placed in an extended position during formation of the spout member. The insert is configured to form one or more stop members integrally with the spout member side wall. The extendible and retractable portion of the inset is then retracted when the third mold section is engaged with the first mold section. The insert then forms a recess in the chimney member adjacent the stop member and the retracted portion of the insert forms the ends of the recess, when the moldable material is injected into the second mold cavity.

The tamper evident member may be formed integrally with either the spout member or the chimney member. In order to form the tamper evident member integrally with the chimney member, the first mold section is provided with a retractable insert or core which cooperates with the second mold section to form the opening in the spout member end wall. The core is then retracted when the second mold section is replaced with the third mold section, to form a ring-shaped cavity portion that overlies the outer surface of the spout member end wall and which communicates through spaced apart passages with a space located within the spout member opening, which is adapted to receive material injected into the second mold cavity which is destined to form the spout member closure structure. Such material is thus also supplied through the spaced apart passages to the ring-shaped cavity portion to form the tamper evident member. The spaced apart passages thus form gate areas between the closure structure space and the ring-shaped cavity portion, to form frangible bridge or connector sections therebetween. In this manner, the tamper evident member, which is in the form of a ring, overlies the end wall of the spout member and is engaged with the chimney member when the spout member and chimney member are initially formed with the spout member in its closed position. With this structure, the tamper evident member is removed by breaking the frangible bridge or connector sections so as to allow the spout member to be moved away from its initial closed position. Alternatively, outward movement of the spout member away from its closed position toward its open position functions to break the frangible bridge or connector sections between the closure structure of the chimney section and the tamper evident member. In either case, separation of the tamper evident member provides evidence as to initial opening of the spout member.

In another embodiment, the tamper evident member is in the form of a ring member formed integrally with the spout member, and spaced outwardly from the outer wall of the spout member. The base section of the chimney member preferably defines an upstanding wall, which may be associated with the stop member and recess structure. The first and second mold sections include gate areas that form frangible bridge or connector members between the tamper evident member and the spout member side wall. The upstanding wall of the chimney member, which is located between the spout member outer wall and the tamper evident member, is formed about the frangible bridge or connector members when the chimney member is formed in the second mold cavity. Movement of the spout member away from its closed position functions to sever the frangible members so as to separate the tamper evident member, to provide an indication as to movement of the spout member away from its initial closed positions.

The invention further contemplates an improvement in a dual component spout-type closure assembly, as well as a two-piece spout-type closure assembly, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 11 is a top plan view of an alternate embodiment of a spout-type container closure assembly similar to that of FIGS. 1–8;

FIG. 12 is a section view taken along line 12—12 of FIG. 11, showing the spout member in a closed position;

FIG. 13 is a view similar to FIG. 12, showing the spout member in an open position;

FIGS. 14 and 15 are partial section views illustrating mold arrangements for forming the spout and chimney member components for the container closure assembly of FIGS. 11–13;

FIG. 16 is a partial section view illustrating an alternative embodiment for the spout member and chimney member incorporated into a container closure assembly similar to that of FIGS. 11–13, showing the spout member in a closed position;

FIG. 17 is a view similar to FIG. 16, showing the spout member in an open position;

DETAILED DESCRIPTION OF THE INVENTION

Figure 1:
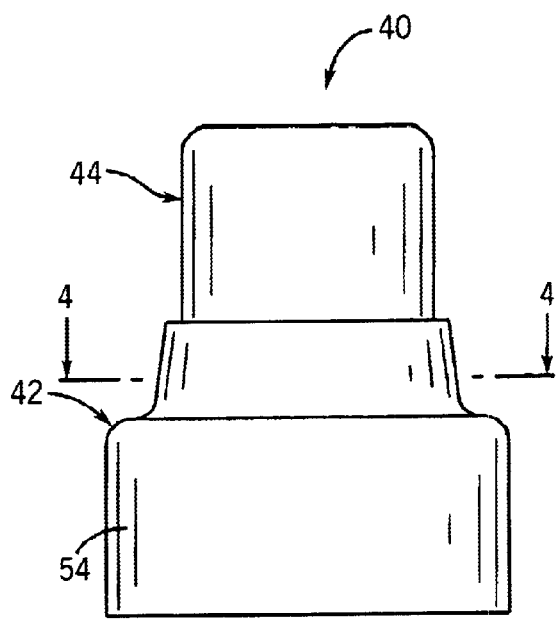
FIG. 1 is a side elevation view of a spout-type container closure assembly constructed according to the present invention, showing a spout member associated with the closure assembly in a closed position.
Figure 2:
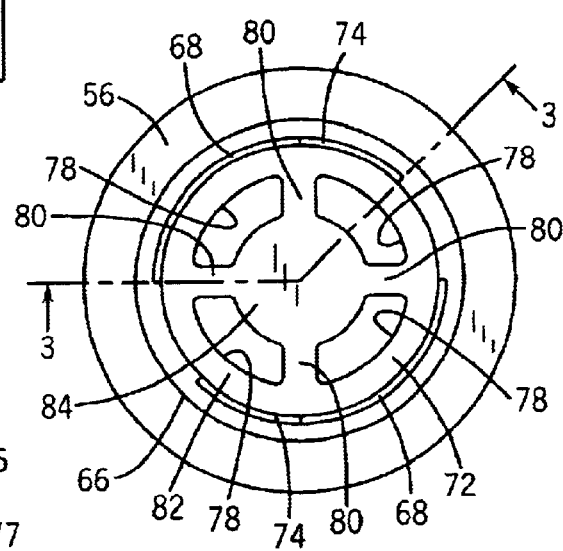
FIG. 2 is a top plan view of the spout-type container closure assembly of FIG. 1.

Referring to FIGS. 1–4, a container closure assembly 40 generally includes a chimney member 42 and a spout member 44. In a manner as is known, container closure assembly 40 is adapted to be secured to a container for dispensing the container contents through container closure assembly 40. Representatively, the container includes a container body defining an internal cavity within which a flowable material is received, and a container neck extending from the body and defining an open passage in communication with the internal cavity of the container. Container closure assembly 40 is engageable with the container neck and, in a manner to be explained, selectively enables the container contents to be dispensed from the container or to maintain the container contents within the container.

Chimney member 42 includes a base section 46 defining an interior 48, and a chimney section 50 that extends outwardly from base section 46 and defines an internal cavity 52. Base section 46 includes a side wall 54 and an upper ring wall 56 extending between chimney section 50 and the upper end of side wall 54. The inner surface of side wall 54 includes engagement structure, which may be in the form of internal threads 58, that are adapted to mate with external threads formed on the container neck in order to mount container closure assembly 40 to the container neck in a conventional manner. Alternatively, base section 46 may include a flange or rib arrangement, or any other satisfactory structure for engagement with or mounting to the container.

Chimney section 50 includes a side wall 60 extending upwardly from the inner end of base section ring wall 56, in combination with an end wall 62 located at the upper end of side wall 60 and extending transversely relative to the longitudinal axis of chimney section 50 and base section 46. An opening 64 is formed in chimney member end wall 62, and communicates with chimney section internal cavity 52.

Chimney member 42 further includes a peripheral upwardly extending flange 66 formed integrally with base section ring wall 56. Flange 66 is formed so as to define a pair of arcuate recesses 68, located on opposite sides of chimney section 50.

Figure 7:
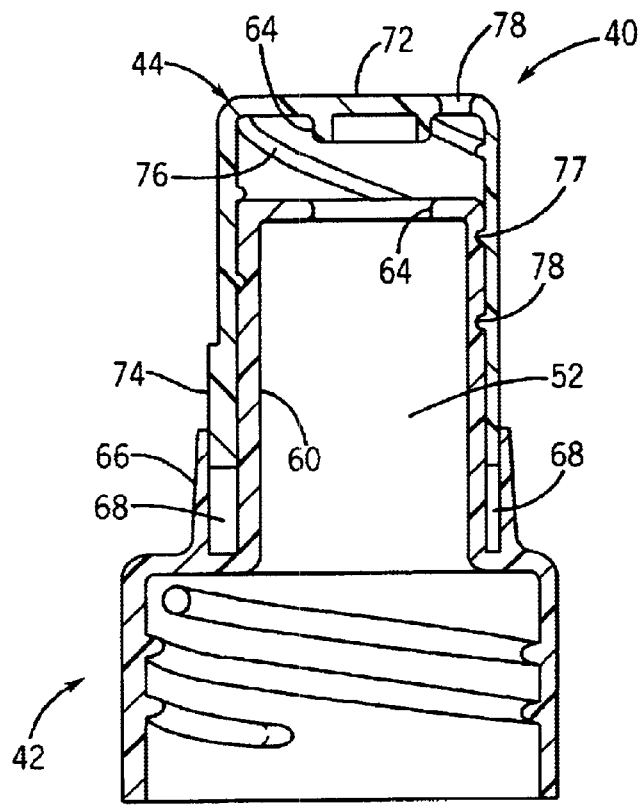
FIG. 7 is a section view taken along line 7—7 of FIG. 6.
Figure 8:
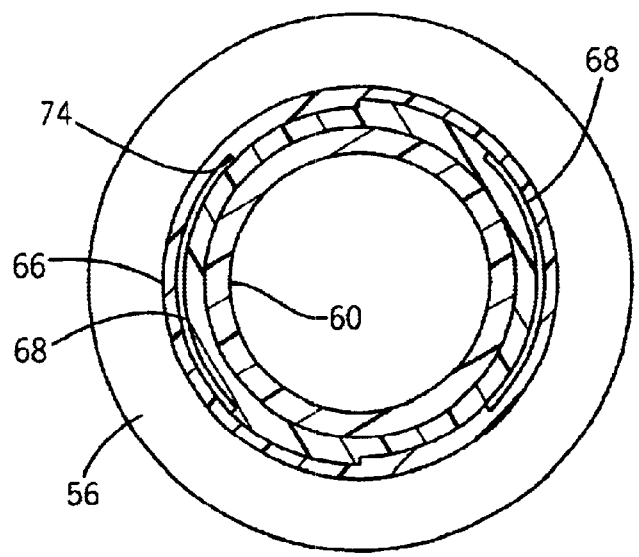
FIG. 8 is a section view taken along line 8—8 of FIG. 5.

Spout member 44 includes a spout member side wall 70 and a spout member end wall 72, which cooperate to form an internal passage within which chimney section 50 is located. Spout member side wall 70 is formed with a pair of outwardly extending stop members 74, each of which is received within one of recesses 68 defined by flange 66. In addition, spout member side wall 70 and chimney section side wall 60 are formed with mating engagement structure, in the form of helical threads 76 formed on the inner surface of spout member side wall 70, and mating helical grooves 77 formed on the outer surface of chimney section side wall 60. Threads 76 and grooves 77 function to move spout member 44 axially outwardly relative to chimney member 42 upon rotational movement of spout member 44 to an open position, as shown in FIG. 7, and axially inwardly to the closed position of FIG. 3 by turning spout member 44 in the opposite direction of rotation.

Figure 3:
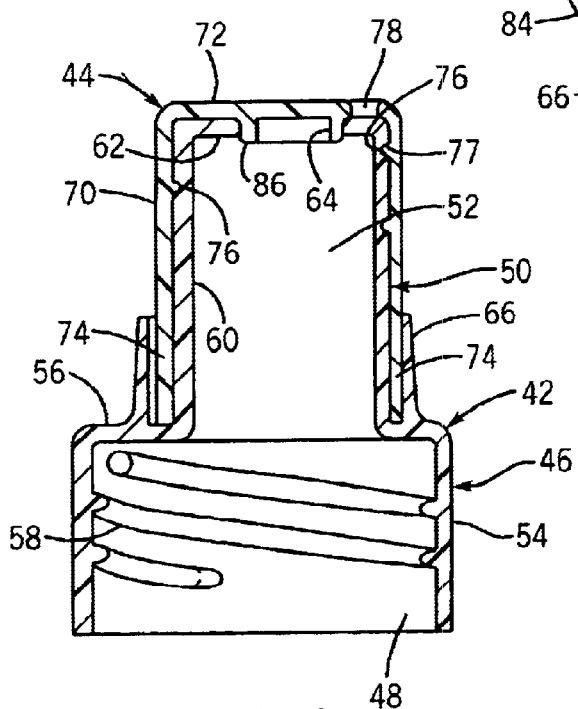
FIG. 3 is a section view taken along line 3—3 of FIG. 2.
Figure 4:
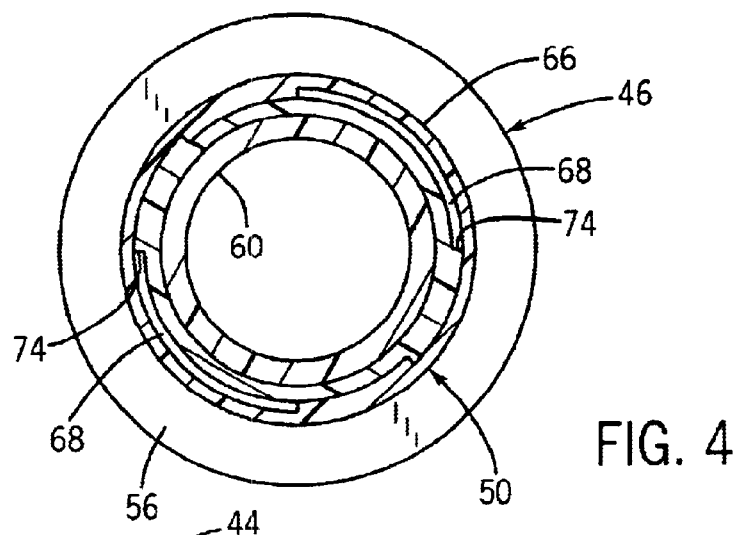
FIG. 4 is a section view taken along line 4—4 of FIG. 1.
Figure 5:
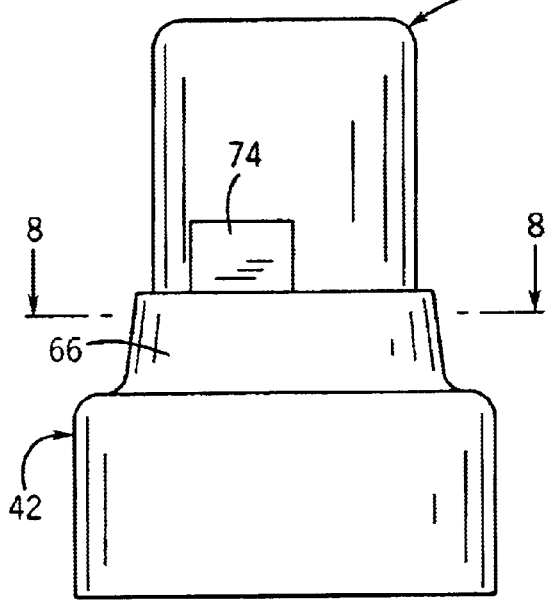
FIG. 5 is a view similar to FIG. 1, showing the spout member of the closure assembly in an open position.
Figure 6:
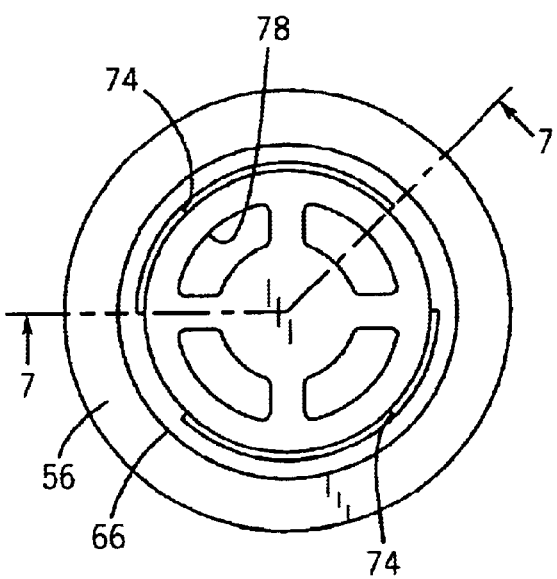
FIG. 6 is a top plan view of the container closure assembly of FIG. 5.

In addition, spout member end wall 72 is formed with a series of spout openings 78 separated by webs 80, which interconnect an outer ring area 82 and a central area 84 of spout member end wall 72. Spout member end wall 72 further includes a central peripheral plug wall 86 which extends inwardly from the inner surface of spout member end wall 72. As shown in FIG. 3, plug wall 86 is engaged within chimney member opening 64 when spout member 44 is in its closed position, to close opening 64 and to thereby prevent communication between opening 64 and spout openings 78. As shown in FIG. 7, plug wall 86 is disengaged from chimney member opening 64 when spout member 44 is in its open position, so as to establish communication between chimney member opening 64 and spout openings 78.

Each arcuate recess 68 formed in flange 66 defines a pair of spaced apart ends. When spout member 44 is in its closed position of FIG. 3, each stop member 74 of spout member 44 is located adjacent one end of its respective recess 68. When spout member 44 is rotated so as to move spout member 44 to its open position of FIG. 7, each stop member 74 is moved within its respective recess 68 toward the opposite end of recess 68. When spout member 44 is in its fully open position of FIG. 7, each stop member 74 engages the opposite end of its respective recess 68 for preventing further rotational movement of spout member 44 relative to chimney member 42. In this manner, spout member 44 is movable relative to chimney member 42 between its open and closed positions, but cannot be disengaged from chimney member 42 due to engagement of stop members 74 with the end surfaces of recesses 68.

Figures 9, 10:
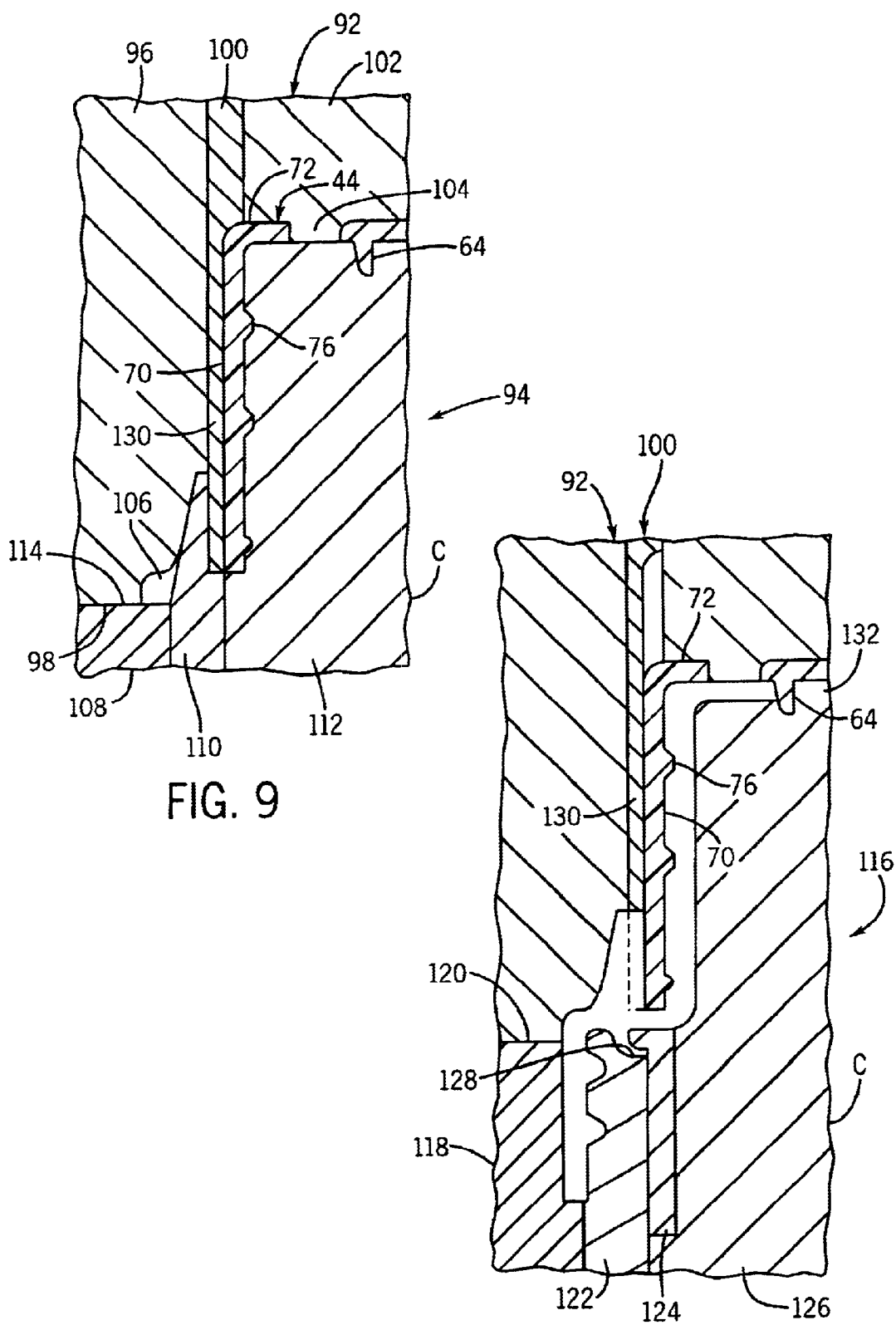
FIG. 9 is a partial section view showing a mold arrangement for forming the spout member of the spout-type container closure assembly of FIGS. 1–8.
FIG. 10 is a view similar to FIG. 9, showing a mold arrangement for forming the chimney member of the spout-type container closure assembly of FIGS. 1–8, incorporating the spout member formed as in FIG. 9.

FIGS. 9 and 10 show sections of a mold arrangement for use in forming container closure assembly 40. It is understood that the illustrated components of the mold arrangement are generally symmetrical about a center line C.

Referring to FIG. 9, spout member 44 is first formed in a mold arrangement including a first mold section 92 and a second mold section 94. First mold section 92 is configured to define the outer surfaces of spout member 44, and second mold section 94 is configured to define the inner surfaces of spout member 44. First mold section 92 includes an outer mold block 96 having a stop surface 98, in combination with a sleeve 100 and a core 102.

Outer mold block 96 and core 102 define an annular space within which sleeve 100 is located. Sleeve 100 is configured to form stop members 74, and defines an inner surface configured to correspond to the outer surface of spout member side wall 70 and the transition area between spout member side wall 70 and spout member end wall 72. Core 102 defines a lower surface configured to correspond to the outer surface of spout member end wall 72, and includes projections 104 which are operable to form openings 78 in spout member end wall 72.

Outer mold block 96 of first mold section 92 further includes a void area 106 located above stop surface 98 and outwardly of sleeve 100, the function of which will later be explained.

Second mold section 94 includes an outer mold block 108, a mold insert 110 and a core 112. Outer mold block 110 defines a stop surface 114 that engages stop surface 98 of outer mold block 96 of first mold section 92, to position second mold section 94 relative to first mold section 92. Mold insert 110 is configured to fill the inner portion of void area 106 in outer mold block 96, so as to support the lower end of sleeve 100 and to cut off communication between void area 106 and the cavity within which spout member 44 is formed. Core 112 of second mold section 94 is configured to define the inner and end surfaces of spout member 44, and includes an end surface that engages projections 104 in core 102 of first mold section 92.

In a manner as is known, a moldable material is injected into the mold cavity defined by first mold section 92 and second mold section 94, to form spout member 44 in an injection molding process. Spout member 44 is preferably formed of any suitable type of injection moldable thermoplastic material, although any other material may be employed as desired.

After spout member 44 is formed using first mold section 92 and second mold section 94, spout member 44 remains engaged with first mold section 92 and second mold section 94 is replaced with a third mold section 116, as shown in FIG. 10. Third mold section 116 cooperates with first mold section 92 and spout member 44 to form a cavity within which chimney member 42 is formed in an injection molding process. Third mold section 116 includes an outer mold block 118 having a stop surface 120 adapted to engage stop surface 98 of first mold section 92, in combination with a sleeve 122, an insert 124 and a core 126. Outer mold block 118 and sleeve 122 cooperate with void area 106 in outer mold block 96 of first mold section 92, so as to form void areas corresponding to side wall 54, ring wall 56 and flange 66 of chimney member 42. If desired, sleeve 122 and insert 124 may be configured to form a seal member cavity portion 128 extending from the void area within which ring wall 56 is formed, to form a depending seal member engageable with the upper end of the container neck, to create a seal between chimney member 42 and the upper edge of the container neck. In addition, sleeve 122 includes helical grooves within which threads 58 of base section 46 are adapted to be formed.

Sleeve 100 of first mold section 92 includes a retractable section 130, which is adapted to be retracted such that its outer end is in alignment with the upper end of void area 106 in outer mold block 96 of first mold section 92.

Core 126 of third mold section 116 is configured to define the inner surfaces of chimney section side wall 60 and end wall 62. The inner surfaces of spout member side wall 70 and end wall 72, in combination with the lower portions of the outer surfaces of spout member side wall 70 in alignment with retractable section 130 of insert 100, cooperate with third mold section 116 and first mold section 92 to form a cavity corresponding in shape to chimney member 42. In this manner, injection of a moldable material, such as a thermoplastic material, into the cavity defined by first mold section 92, third mold section 116 and spout member 44, functions to form chimney member 42 having a configuration as shown and described previously.

During formation of chimney member 42 within and around spout member 44 as shown and described, the various surfaces of chimney member 42 are formed so as to interact with the exposed areas of spout member 44 to form correspondingly shaped surfaces on chimney member 42. In this manner, recesses 68 are formed in chimney member flange 66, and the retractable section 130 of first mold section sleeve 100 is operable to form the areas of flange 66 located between recesses 68. One of the side edges of each stop member 74 is operable to form an end wall of its respective recess 68 during formation of chimney member flange 66. The inner surfaces of spout member side wall 70 form the outer surfaces of chimney section side wall 60, and threads 76 in spout member side wall 70 function to form the mating helical grooves 77 in the outer surface of chimney member side wall 60. Projections 104 of first mold section core 102 remain in place within spout openings 78, and define end surfaces which cooperate with the inner surface of spout member end wall 72 so as to form the closed outer peripheral area of spout member end wall 72 which overlaps spout openings 78. Third mold section core 126 includes a projection 132 received within plug wall 86 of spout member end wall central area 84, and the end portion of plug wall 86 is received within a peripheral groove located outwardly of projection 132. In this manner, plug wall 86 and core 126 provide a seal against the flow of moldable material inwardly of plug wall 86, such that plug wall 86 is operable to form opening 64 in chimney section end wall 62.

After chimney member 42 is formed as shown and described, first mold section 92 is removed, and the assembled chimney member 42 and spout member 44 are ejected from third mold section 116 in a known manner.

Chimney member 42 and spout member 44 are thus sequentially formed together in a manner in which spout member 44 is engaged with chimney member 42 in its closed position, such that chimney member end wall 62 functions to close spout openings 78, and plug wall 86 closes chimney section opening 64.

FIGS. 11–13 illustrate an alternative container closure assembly 40a which is constructed generally similarly to container closure assembly 40 as described above, and like reference characters are used where possible to facilitate clarity. In this version, spout member end wall 72a is provided with a single central spout opening 78a, and chimney section end wall 62a is formed with a series of radially spaced chimney member openings 64a. In addition, chimney section end wall 62a is formed with outwardly extending plug structure 138 that extends into spout opening 78a for closing communication between chimney member openings 64a and spout opening 78a. The configuration of mold cores 102, 112 and 126 (FIGS. 9, 10) is modified to that of mold cores 102a, 112a and 126a as shown in FIGS. 14 and 15, so as to form spout opening 78a and chimney section plug structure 138 as shown. In the same manner as described previously, spout member 44a is first formed using mold sections 92a, 94a so as to include spout opening 78a. Mold core 102a of first mold section 92a is formed to define a flat end surface that is engaged by a projection 140 associated with core 112a of second mold section 94a, to form spout opening 78a. Chimney member 42a is then formed using first mold section 92, third mold section 116 and spout member 44a in the same manner as described above. After spout member 44a is formed, third mold section 116a is engaged with first mold section 92a, and cooperates with first mold section 92a and spout member 44a to form a cavity within which chimney member 42a is adapted to be formed. Core 126a of third mold section 116a includes radially spaced projections 142 which engage the underside of spout member end wall 72a, to form chimney section openings 64a. Core 126a further includes a recessed central surface 144 including an outer channel which extends outwardly of the inner end of spout member opening 78a, to form chimney section plug structure 138. In this manner, plug structure 138 conforms to opening 78a, and spout member 44a is initially formed in its closed position as shown in FIG. 12 such that spout member opening 78a is isolated from chimney section openings 64a.

FIGS. 16 and 17 illustrate an alternative container closure assembly 40b which is formed in a manner similar to that of container closure assembly 40 described previously. Again, like reference characters will be used where possible to facilitate clarity. In this version, spout member 44b is formed with parallel peripheral inwardly extending rings 148 in the inner surface of spout member side wall 70b. Rings 148 are operable to form parallel spaced grooves 150 in the outer surface of chimney member side wall 54a during formation of chimney member 42a. As before, the mold sections employed to form the components of closure assembly 40b are configured such that spout member 44b is in its closed position relative to chimney section 50b upon initial formation, such that rings 148 and grooves 150 are formed so as to maintain spout member 44b in its closed position. Rings 148 and 150 provide releasable engagement between spout member 44b and chimney section 50b, such that spout member 44b can be moved axially outwardly away from its closed position of FIG. 16 to an open position of FIG. 17 upon application of an axial outward force to spout member 44b, to establish communication between spout member opening 78b and chimney section openings 64b. When spout member 44b is moved to its open position of FIG. 17, the lower ring 148 is engaged within the upper groove 150 so as to maintain engagement of spout member 44b with chimney section 50b. The upper ring 148 is positioned above the upper end of chimney member side wall 54a. Spout member 44b can be returned to its closed position of FIG. 16 by application of an axial push-on force, which causes rings 148 to slide along the outer surface of chimney member side wall 54a until rings 148 reach grooves 150 when spout member 44b is in its fully closed position of FIG. 16. The configuration of the mold sections employed to form spout member 44b and chimney section 50b is modified from the configuration illustrated in FIGS. 9 and 10, such that flange 66 and stop members 74 are eliminated, and spout member threads 76 and mating chimney section grooves 78 are eliminated and replaced with rings 148 and grooves 150.

Figure 18:
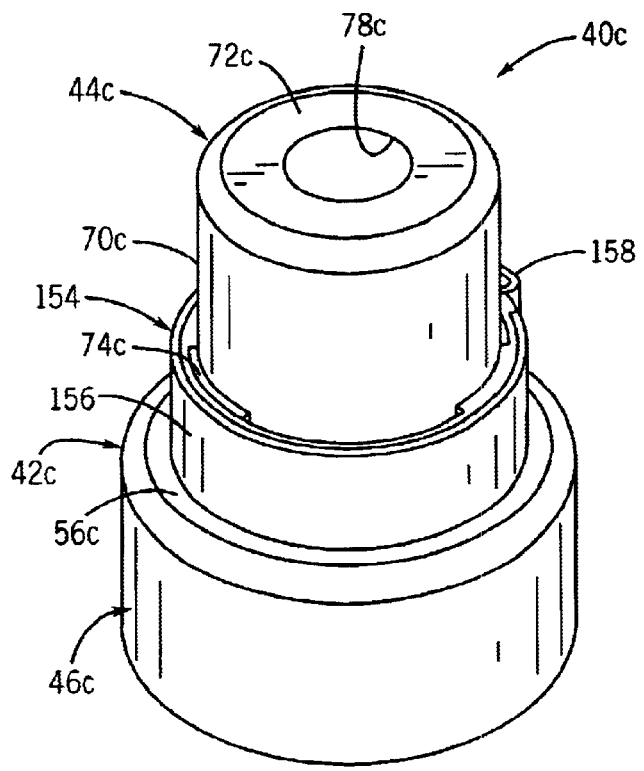
FIG. 18 is an isometric view of another embodiment of a spout-type container closure assembly constructed according to the invention, incorporating a tamper evident feature, showing the spout member in a closed position.
Figure 19:
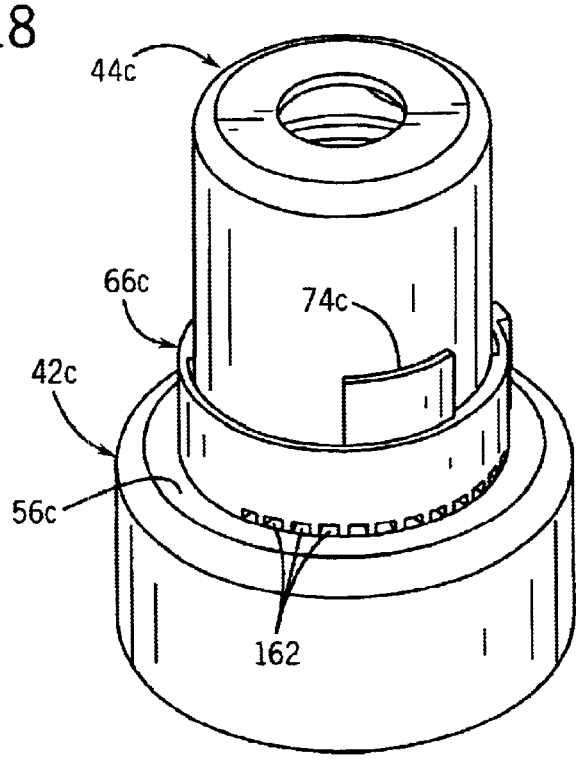
FIG. 19 is a view similar to FIG. 18, showing the spout member in an open position.
Figure 20:
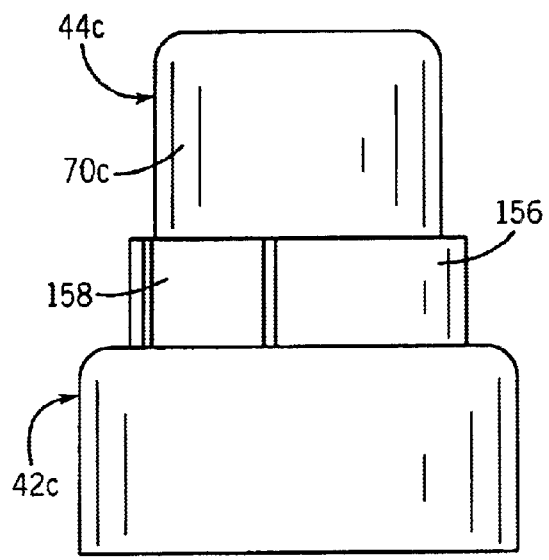
FIG. 20 is a side elevation view of the container closure assembly of FIG. 18, showing the spout member in a closed position.
Figure 21:
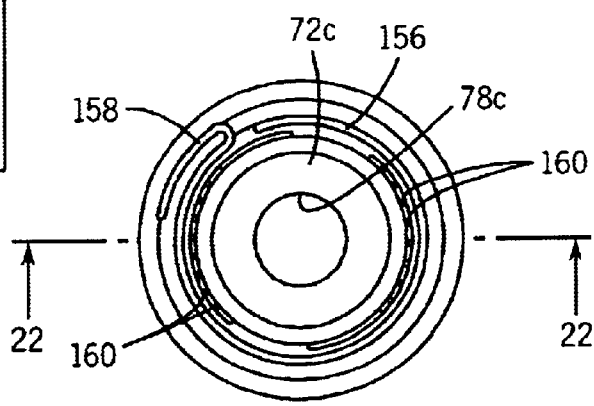
FIG. 21 is a top plan view of the container closure assembly of FIG. 20.
Figure 22:
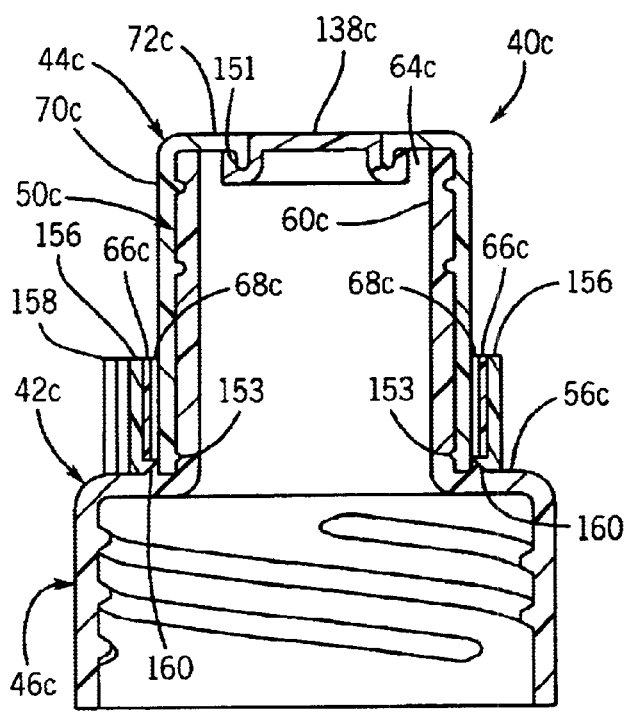
FIG. 22 is a section view taken along line 22—22 of FIG. 21.
Figure 23:
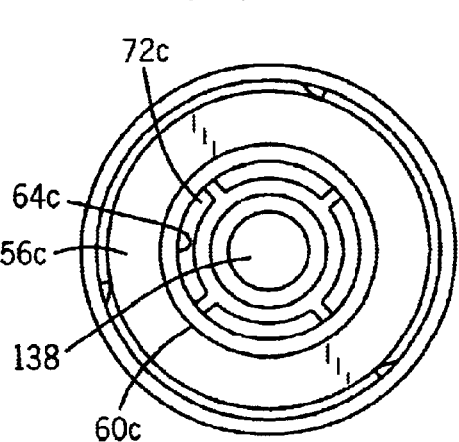
FIG. 23 is a bottom plan view of the container closure assembly of FIGS. 18–22.
Figure 24:
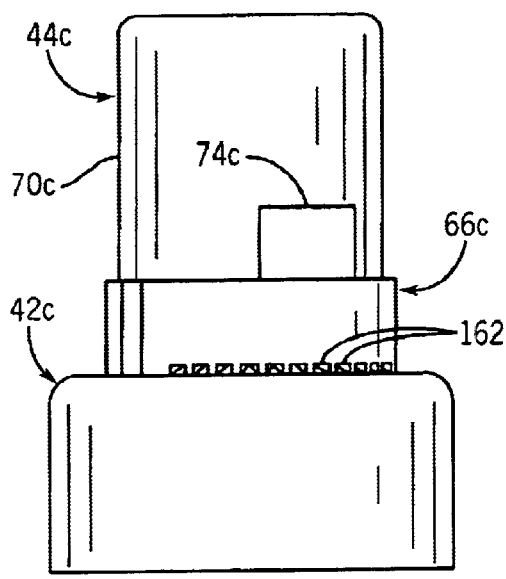
FIG. 24 is a side elevation view similar to FIG. 20, showing removal of the tamper evident member and movement of the spout member to its open position.
Figure 25:
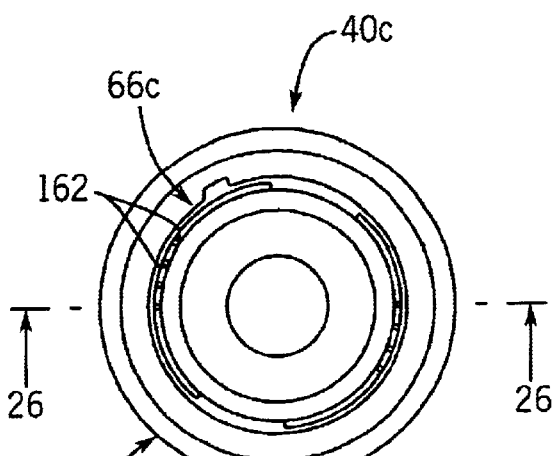
FIG. 25 is a top plan view of the container closure assembly of FIG. 24.
Figure 26:
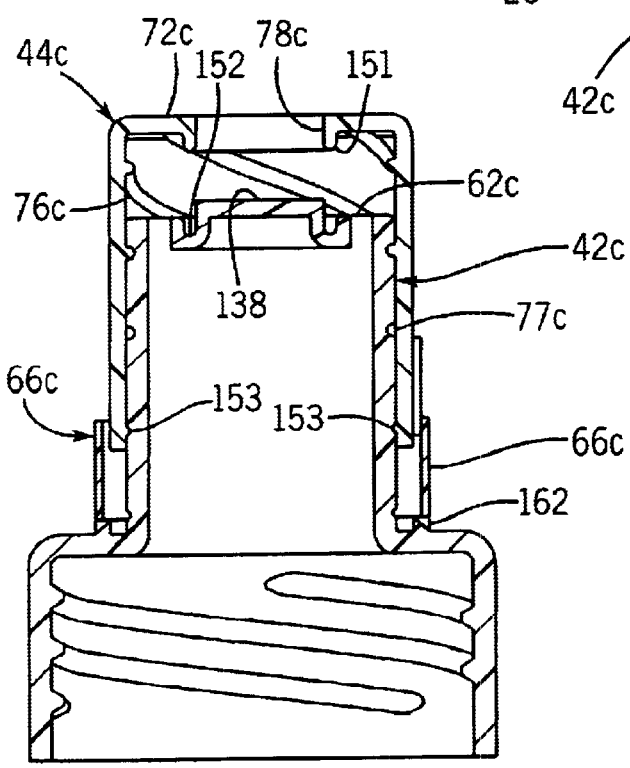
FIG. 26 is a section view taken along line 26—26 of FIG. 25.
Figure 27:
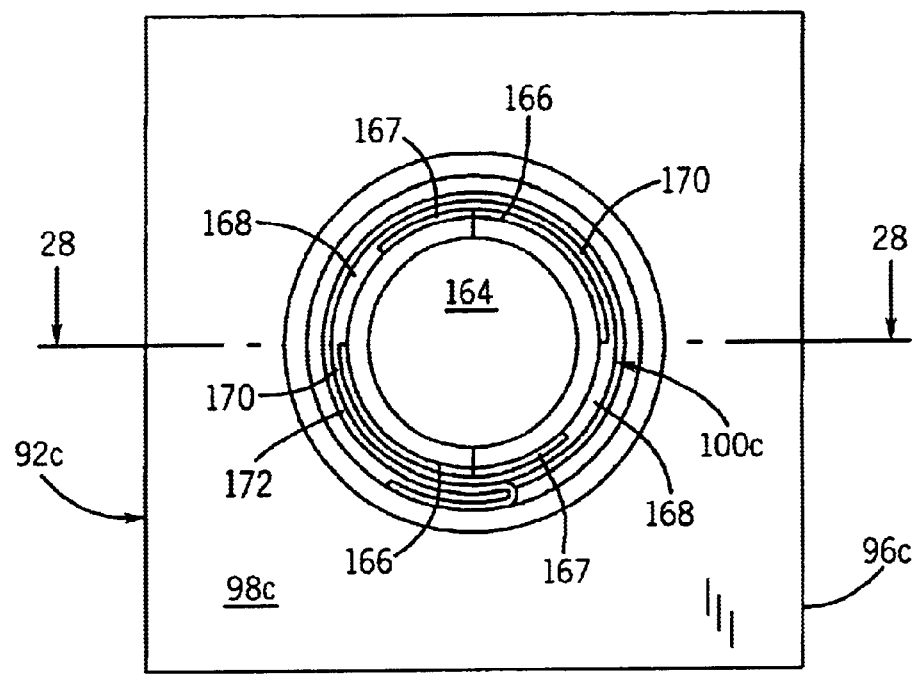
FIG. 27 is a bottom plan view of a first mold section utilized to form the spout member of the container closure assembly of FIGS. 18–26.
Figure 28:
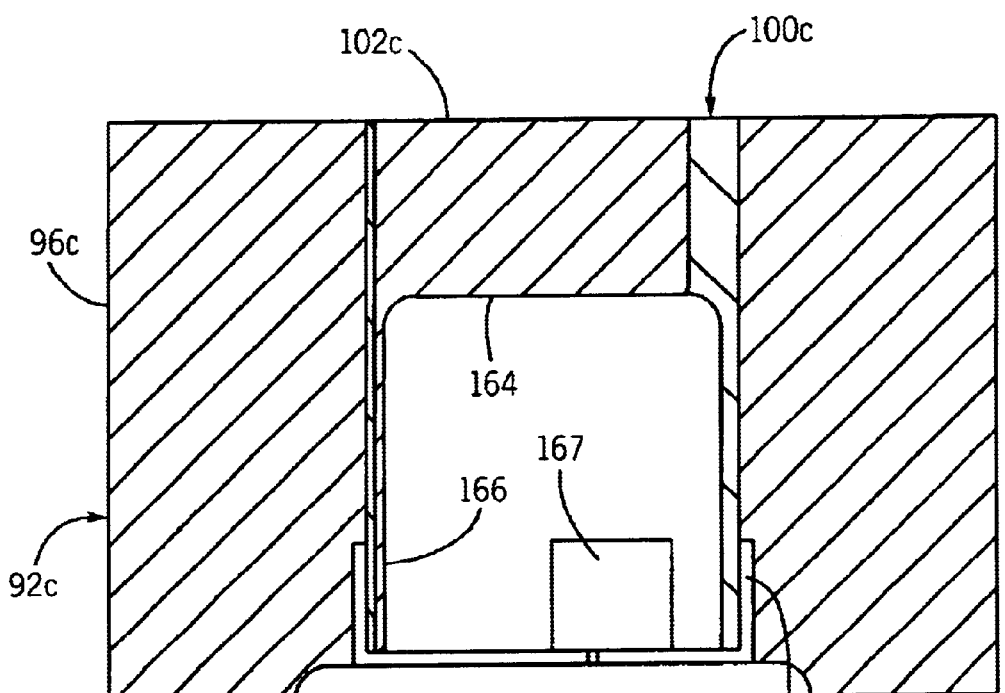
FIG. 28 is a section view taken along line 28—28 of FIG. 27.
Figure 29:
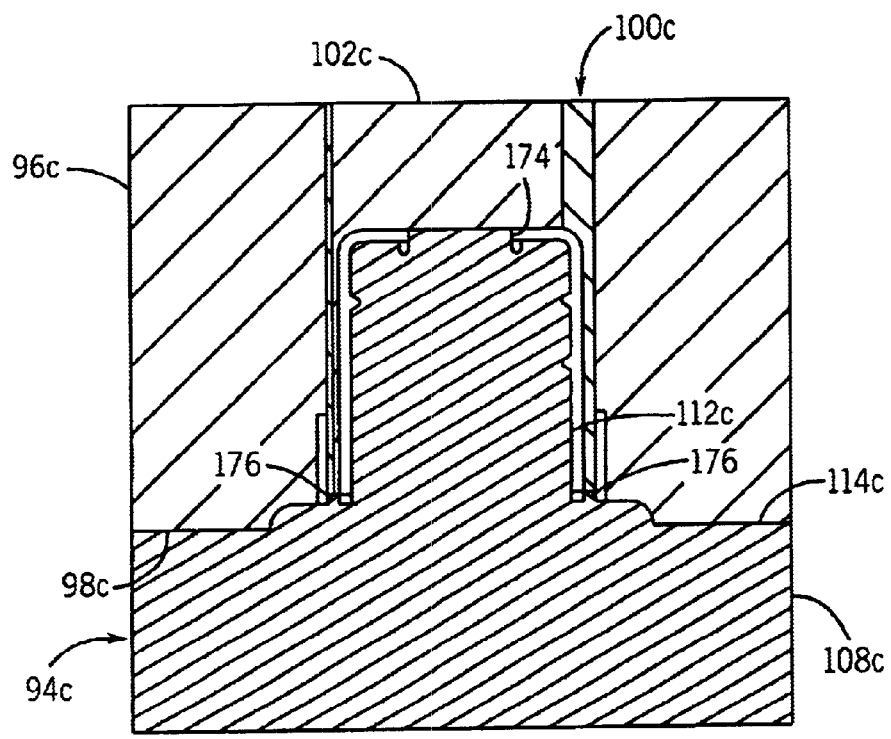
FIG. 29 is a view similar to FIG. 28, showing a second mold section engaged with the first mold section to form a mold cavity utilized to form the spout member.
Figure 30:
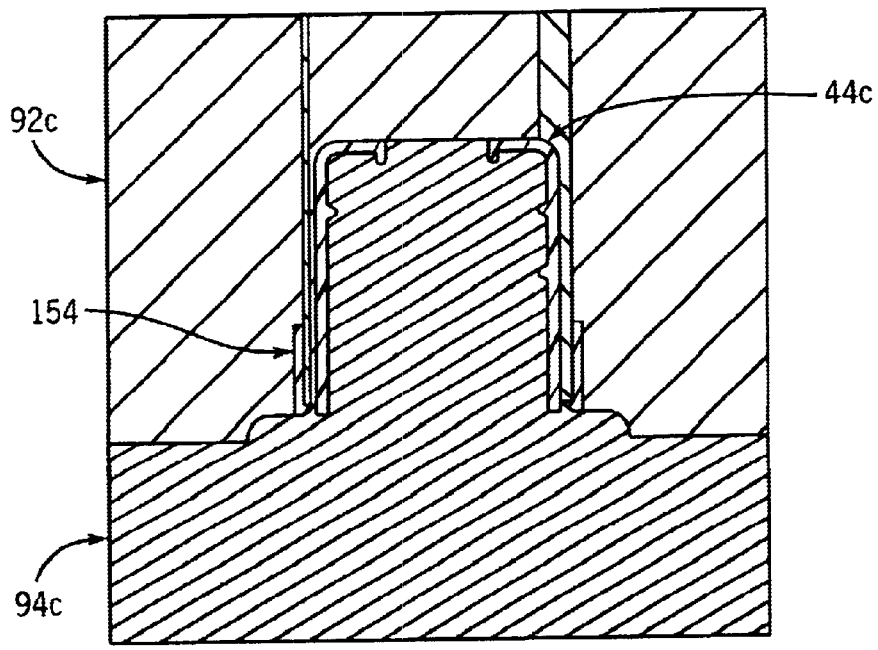
FIG. 30 is a view similar to FIG. 29, showing molding of the spout member.

FIGS. 18–26 illustrate a modified container closure assembly 40c constructed according to the invention. Again, like reference characters will be used where possible to facilitate clarity. Once again, spout member 44c is configured and formed similarly to spout members 44 and 44a, as shown and described above with respect to FIGS. 1–15. Likewise, chimney member 42c is formed similarly to chimney members 42 and 42a as described above with respect to FIGS. 1–15. Spout member 44c is movable relative to chimney member 42c between a closed position as shown in FIG. 18 and an open position as shown in FIG. 19, to establish communication between the spout member opening 78c and the chimney member openings 64c.

The embodiment of FIGS. 18–26 contains features to ensure sealing contact between spout member 44c and chimney section 50c when spout member 44c is in the closed position. Such features include a sealing ring 151 extending inwardly from the inner edge of spout member end wall 72c at spout opening 78c, which is adapted to be received within a peripheral groove 152 formed in chimney section end wall 62c outwardly of chimney section plug structure 138c, when spout member 44c is in its closed position. To ensure sealing contact between spout member 44c and chimney section 50c when spout member 44c is moved between its open and closed positions, a seal bead 153 extends inwardly from the lower end of spout member side wall 70c. When spout member 44c is in its closed position, seal bead 153 is seated within a corresponding groove formed in the lower end of chimney section side wall 70c. When spout member 44c is moved to its open position, seal bead 153 engages the outer surface of chimney member side wall 70c, to ensure sealing contact between spout member 44c and chimney section 50c. Seal bead 153 is located below spout member threads 76c, and also below threads 77c in the outer surface of chimney member side wall 60c when spout member 44c is open, to ensure sealing contact between spout member 44c and chimney section 50c. The presence of seal bead 153 functions to preserve integrity of the seal between spout member 44c and chimney section 50c when spout member 44c is moved between its open and closed positions. These features are designed to accommodate for slight shrinkage of chimney member outer wall 60c relative to spout member side wall 70c, which may occur after molding of such components.

While the seal features described above are shown as being incorporated in closure assembly 40c, it is understood that such features may be incorporated in all of the illustrated embodiments so as to ensure seal integrity between the spout member and chimney member when the spout member is in both its open and closed positions.

In the embodiment of FIGS. 18–26, a tamper evident member, in the form of a ring 154, is engaged with spout member 44c when spout member 44c is initially formed and in its closed position. Tamper evident ring 154 is removable from engagement with spout member 44c so as to enable spout member 44c to be moved to its open position of FIG. 19 relative to chimney member 42c.

In this version, spout member 44c is formed such that spout member side wall 70c is formed integrally with tamper evident ring 154 at the time spout member 44c is formed. Tamper evident ring 154 is generally in the form of a primary ring wall 156 that encircles a majority of the circumference of spout member side wall 70c. A curved end section 158 is formed at one end of tamper evident ring 154. Curved end section 158 provides a finger engagement area, which enables a user to grasp tamper evident ring 154 for removal prior to opening of spout member 44c.

Tamper evident ring 154 is formed with a series of frangible connection sections 160 which extend between and interconnect ring wall 156 with the lower end of spout member side wall 70c. Each connection section 160 defines a convergent cross section in an outward-to-inward direction, such that a small amount of material functions to integrally connect each connector section 160 with the lower end of spout member side wall 70c. Tamper evident ring 154 and its associated connection sections 160 are injection molded along with spout member 44c, by modification of the mold tooling such as is illustrated in FIGS. 9 and 10. Connection sections 160 are defined by a series of spaced apart gate areas in the mold tooling, which are operable to form connection sections 160 upon injection of moldable material into the mold cavity.

In this version, flange 66c is the form of an annular wall located inwardly of tamper evident ring 154. As before, flange wall 66c is formed integrally with upper wall 56c of chimney member base section 46c. Again, the tooling of chimney member 42c is modified so as to form flange wall 66c integrally with the various other components and surfaces of chimney member 44c, and to define recesses 68c. The material of flange wall 66c flows between the formed connector sections 160 and against the inside surface of primary ring wall 156 of tamper evident ring 154 during formation of chimney member 46c, such that a series of spaced apart passages 162 (FIGS. 19, 24) are formed in the lower end of flange wall 66c. With this construction, a user is able to grasp curved end section 158 of tamper evident ring 154, which is flexible due to the thin wall construction of tamper evident ring 154. The user then pulls outwardly on end section 158, which functions to separate tamper evident ring 154 from the lower end of spout member side wall 70c by breaking connection sections 160 away from spout member side wall 70c. With tamper evident ring 154 removed in this manner, which results in removal of connection sections 160 from passages 162, spout member 44c is disengaged from flange wall 64c and can be moved outwardly to its open position relative to chimney member 42c, in the same manner as described previously. With this construction, the presence of tamper evident ring 154 and its connection to spout member 44c functions to maintain spout member 44c in its initial closed position after spout member 44c and chimney member 42c are formed together. If tamper evident ring 154 is not present, the user is alerted of the possibility that spout member 44c may have been opened.

Alternatively, the user can simply leave tamper evident ring 154 in place and rotate spout member 44c toward its open position. Upon application of an adequate force, this functions to sever the connection between connection sections 160 and spout member side wall 70c, to enable spout member 44c to be moved to its open position.

The above construction provides the combined advantages of sequentially forming spout member 44c and chimney member 42c together as described previously, and incorporates a tamper evident feature without significant additional tooling costs or complexity.

FIGS. 27–36 illustrate the mold components and steps involved in forming container closure assembly 40c. Again, like reference characters will be used where possible to facilitate clarity.

Spout member 44c, including tamper evident ring 154, is first formed in a mold arrangement including a first mold section 92c and a second mold section 94c. First mold section 92c is configured to define the outer surfaces of spout member 44c and tamper evident ring 154, and second mold section 94c is configured to define the inner surfaces of spout member 44c. First mold section 92c includes an outer mold block 96c having a stop surface 98c, in combination with a sleeve 100c and a core 102c.

Outer mold block 96c and core 102c define an annular space within which sleeve 100c is located. Core 102c includes an inner surface 164 configured to define the upper surface of spout member end wall 72c. Core 102c further includes depending wall sections 166, and sleeve 100c defines a pair of wide wall areas 168 located within spaces defined between wall sections 166, and thin walls 170 that extend between widened wall areas 168 and surround core wall sections 166. Outwardly of sleeve 100c, outer mold block 96c defines a recess 172 having a shape corresponding to that of tamper evident ring 154. Depending wall sections 166 of core 102c are formed so as to define void areas 167, and one end of each widened wall area 168 functions to form an end of void area 167 in cooperation with a facing spaced end of core wall section 166. Void area 167 has a shape corresponding to that of stop section 74c.

Second mold section 94c includes an outer mold block 108c having a stop surface 114c that engages stop surface 98c of outer mold block 96c of first mold section 92c. Second mold section 94c further includes a projection 112c, which may be in the form of a core or which may be formed integrally with mold block 108c, and which is configured to fill the cavity defined by first mold section 92c and to define the inner and end surfaces of spout member 44c. Projection 112c includes an extension 174 that is engageable with inner surface 164, and which is configured so as to correspond to spout opening 78c.

In a manner as is known, a moldable material is injected into the mold cavity defined by first mold section 92c and second mold section 94c, to form spout member 44c in an injection molding process. Spout member 44c is preferably formed of any suitable type of injection moldable thermal plastic material, although any other material may be employed as desired.

Second mold section 94c is formed with a series of spaced apart projections 176, which are configured to define passages 162 and to thereby form the frangible connection sections 160 between tamper evident ring 154 and spout member side wall 70c.

Figure 31:
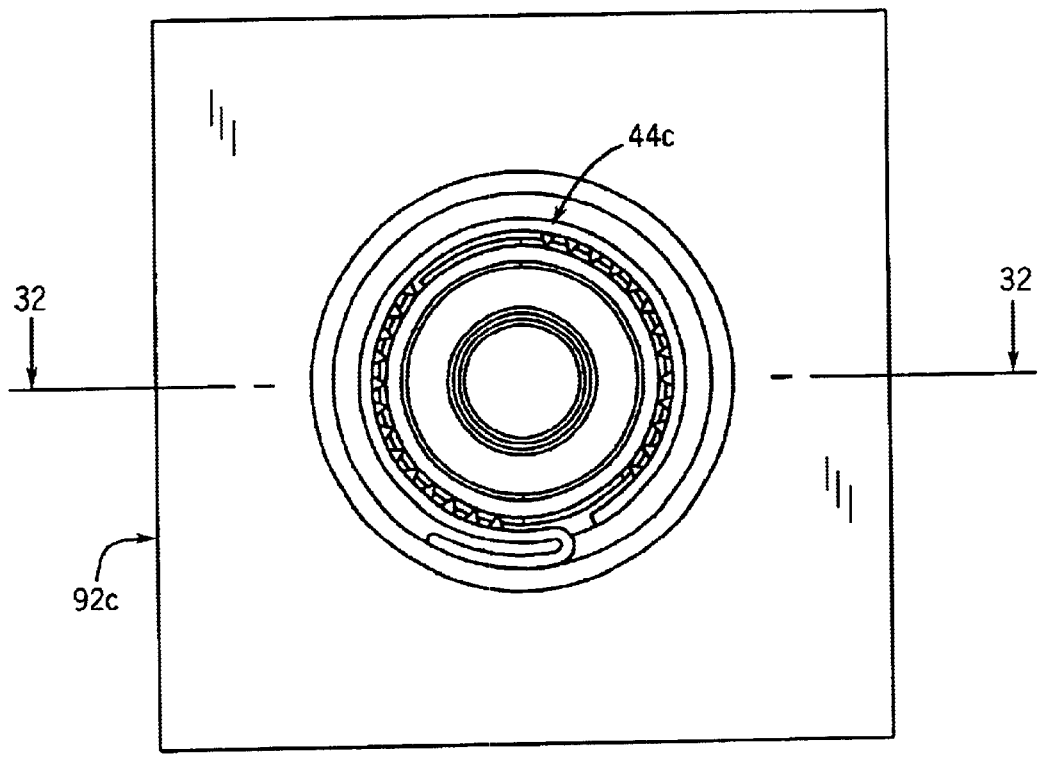
FIG. 31 is a bottom plan view similar to FIG. 27, showing the spout member after molding.
Figure 32:
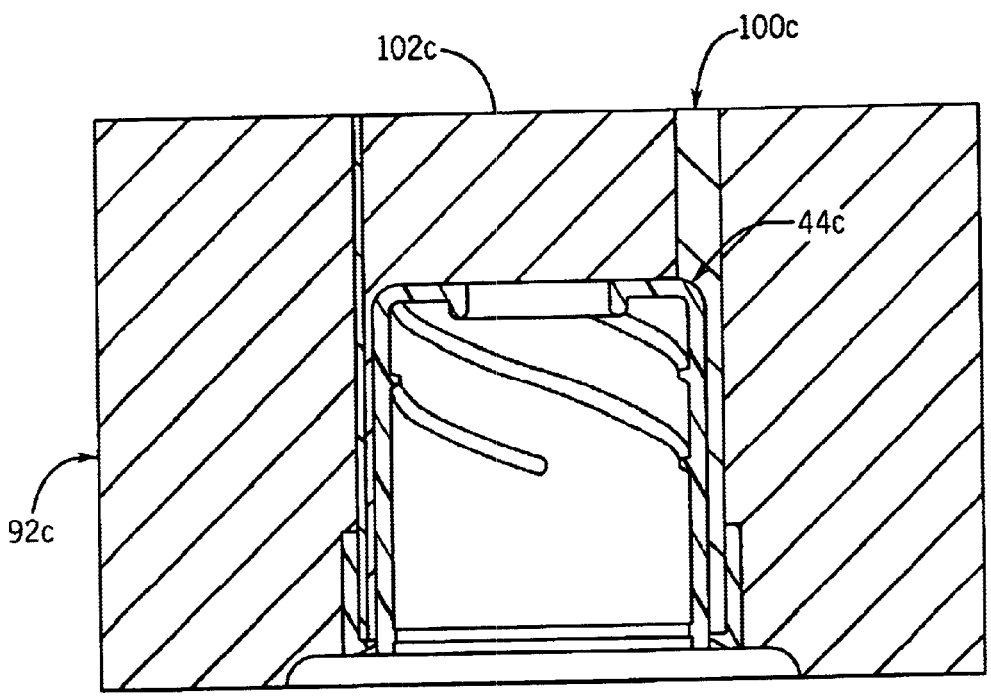
FIG. 32 is a view similar to FIG. 28, showing the spout member and the first mold section after forming of the spout member and removal of the second mold section.
Figure 33:
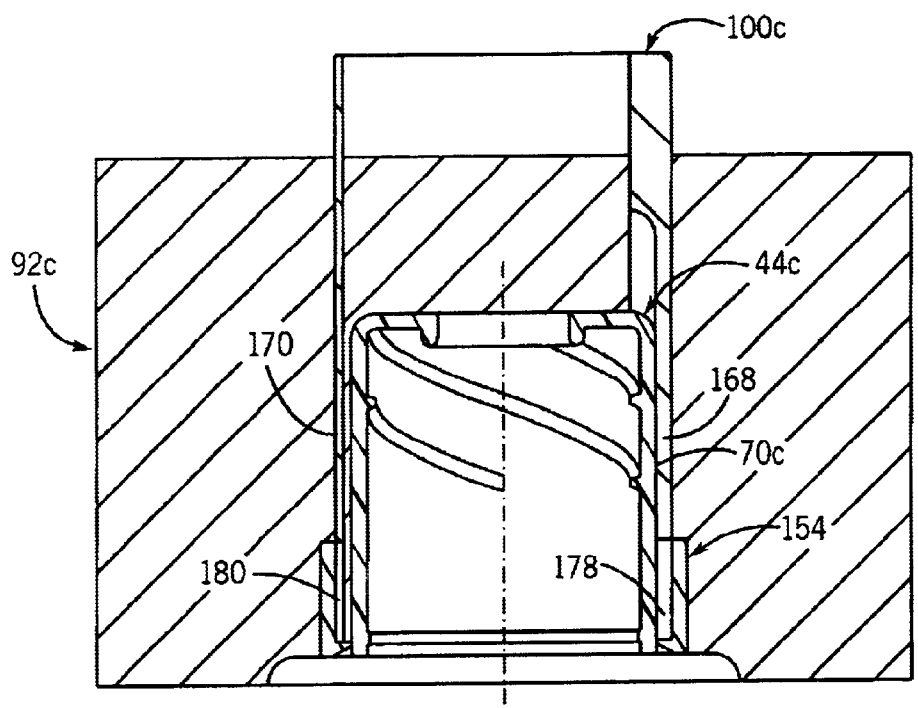
FIG. 33 is a view similar to FIG. 32, showing movement of an insert associated with the first mold section.
Figure 34:
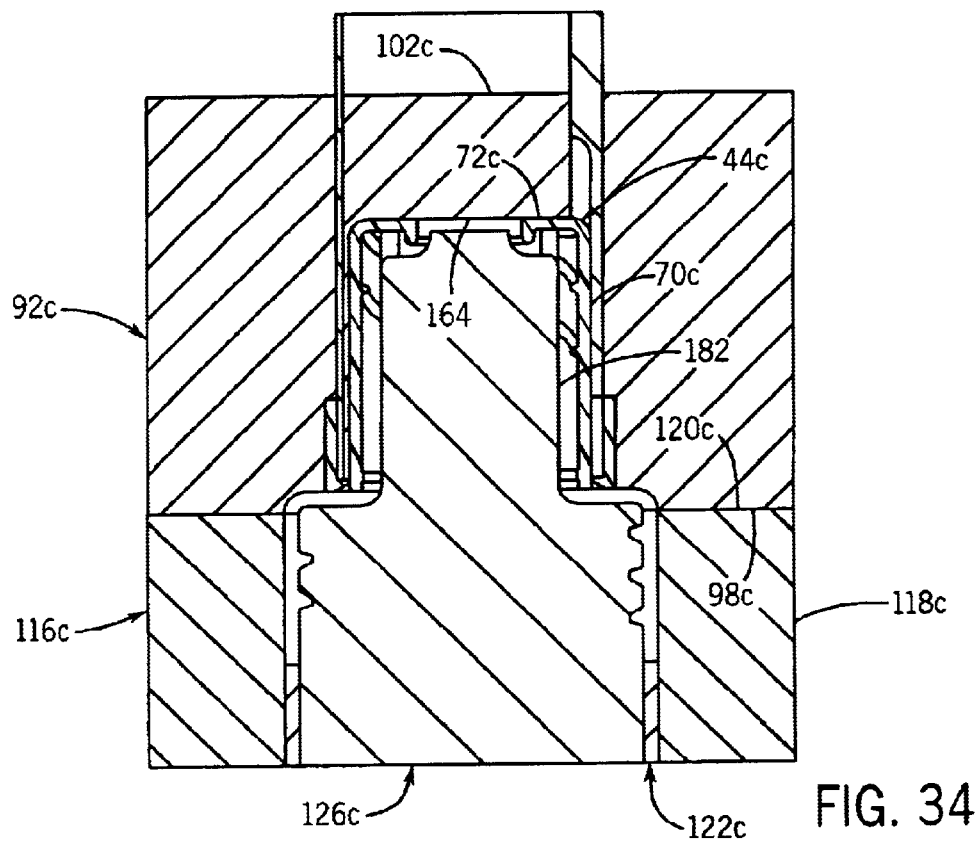
FIG. 34 is a view similar to FIG. 33, showing a third mold section engaged with the first mold section, which cooperates with the first mold section and the spout member to define a cavity within which the chimney member is adapted to be formed.
Figure 35:
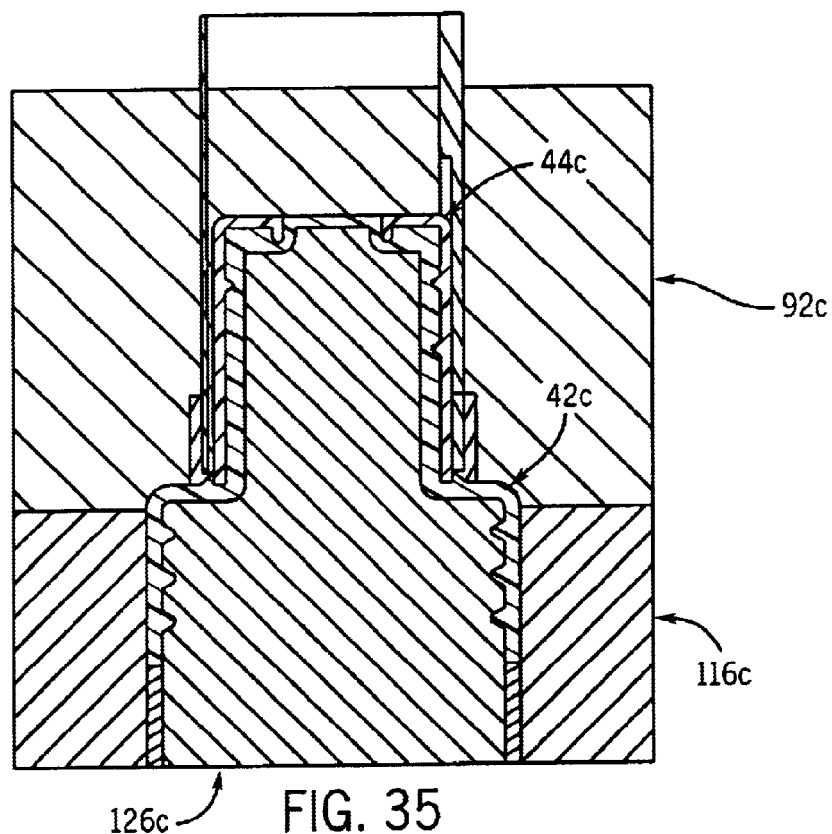
FIG. 35 is a view similar to FIG. 34, showing molding of the chimney member within the cavity defined by the first and third mold sections in combination with the spout member.
Figure 36:
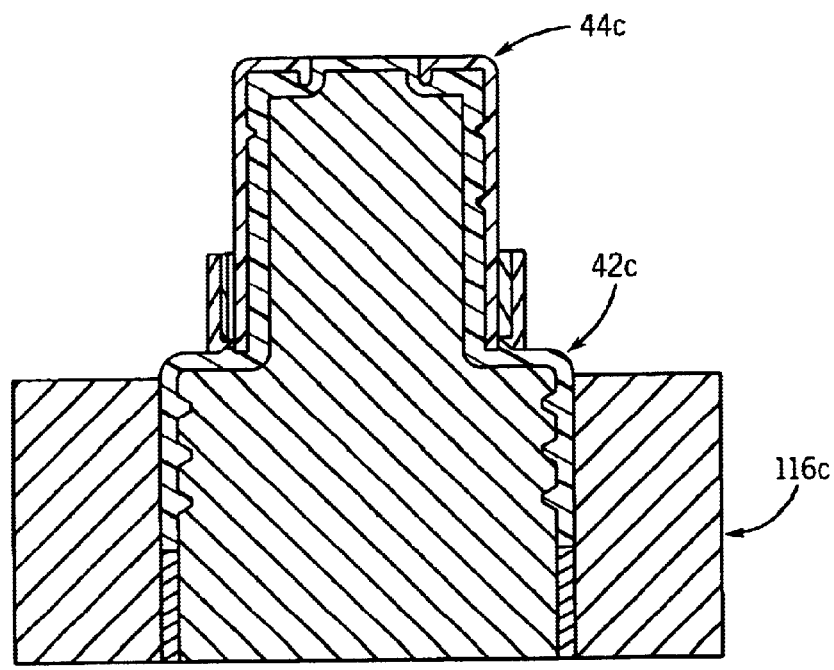
FIG. 36 is a view similar to FIG. 35, showing removal of the first mold section and the formed spout member and chimney member of the container closure assembly of FIGS. 18–26.

After spout member 44c is formed using first mold section 92c and second mold section 94c, spout member 44c remains engaged with first mold section 92c as shown in FIGS. 31 and 32, and sleeve 100c is then moved axially outwardly as shown in FIG. 33 such that the lower ends of sleeve wall areas 168 and walls 170 are substantially coplanar with the outer edge of tamper evident ring 154, as shown in FIG. 33. This functions to create a void area 178 between tamper evident ring 154 and spout member side wall 70c below widened wall areas 168, and void areas 180 below thin walls 170. Second mold section 94c is replaced with a third mold section 116c, as shown in FIGS. 34–36. Third mold section 116c includes an outer mold block 118c having a stop surface 120c adapted to engage stop surface 98c of first mold section 92c, in combination with a sleeve 122c and a core 126c. Outer mold block 118c, in combination with core 126c, cooperate with spout member 44c and the surfaces of first mold section 92c to form void areas corresponding to side wall 54c, ring wall 56c and flange 66c of chimney member 42c. Core 126c of third mold section 116c includes a projection 182 which is configured to define the inner surfaces of chimney section side wall 60c and end wall 62c. The inner surfaces of spout member side wall 70c and end wall 72c, in combination with inner surface 164 of core 102c, cooperate with third mold section 116 and first mold section 92c to form a cavity corresponding in shape to chimney member 42c. In this manner, injection of a moldable material, such as a thermoplastic material, into the cavity defined by first mold section 92, third mold section 116c and spout member 44c, functions to form chimney member 42c having a configuration as shown and described previously.

During formation of chimney member 42c within and around spout member 44c as shown and described, the various surfaces of chimney member 42c are formed so as to interact with the exposed areas of spout member 44c to form correspondingly shaped surfaces on chimney member 42c. In the injection molding process, material is provided to void areas 180 to form flange 66c. Material is also provided to void areas 178 to form the stop surfaces with which stop sections 74c are engageable upon rotation of spout member 44c. After spout member 44c and chimney member 42c are formed in this manner, first mold section 92 is removed axially and chimney member base section 46c is disengaged from third mold section 116c in a conventional manner, to release closure assembly 40c.

Figure 37:
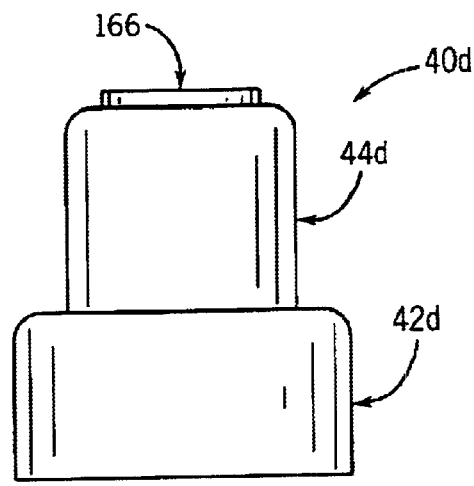
FIG. 37 is a side elevation view of another embodiment of a container closure assembly constructed according to the invention and incorporating a tamper evident feature.
Figure 38:
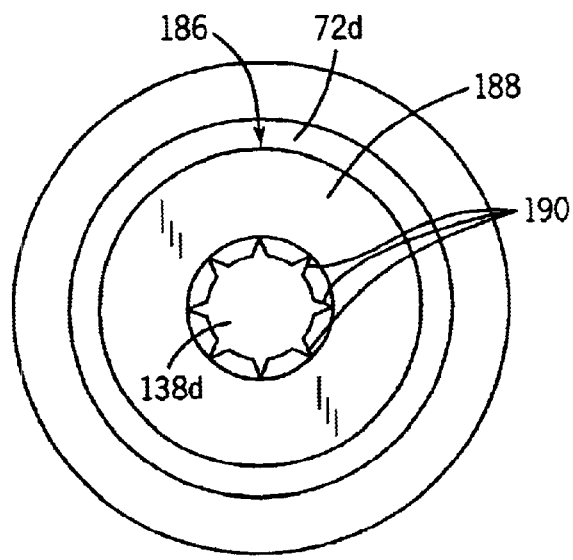
FIG. 38 is a top plan view of the container closure assembly of FIG. 37.
Figure 39:
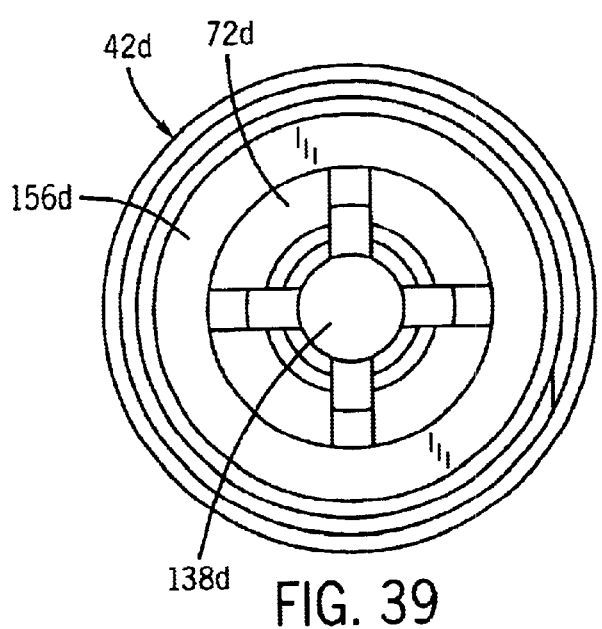
FIG. 39 is a bottom plan view of the container closure assembly of FIG. 37.
Figure 40:
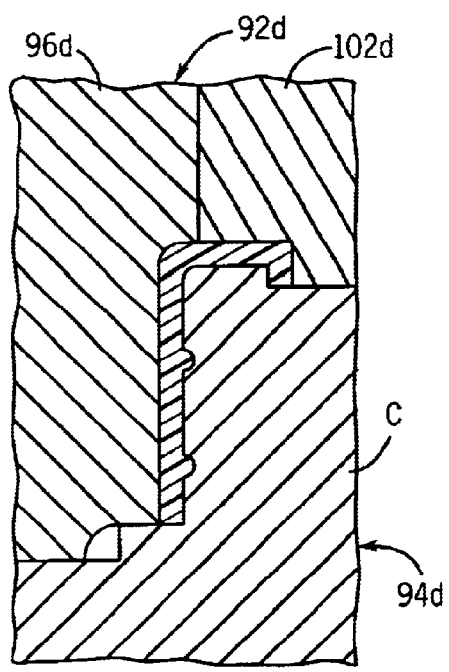
FIGS. 40 and 41 are partial section views illustrating molding of the spout member incorporated into the container closure assembly of FIG. 37.
Figure 41:
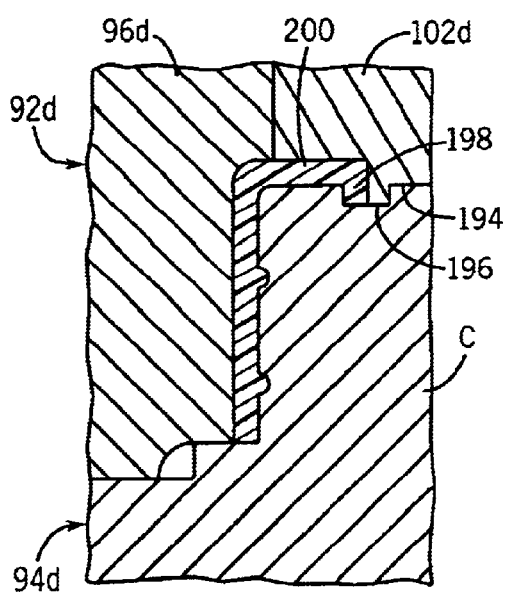

FIGS. 37–39 illustrate another alternative container closure assembly embodiment, shown at 40d, which again is constructed generally similarly to container closure assemblies 40a and 40b as described above. Again, like reference characters will be used where possible to facilitate clarity.

In this embodiment, a tamper evident member 186 is formed integrally with the chimney section plug structure, shown at 138d. Tamper evident member 186 includes an outer ring 188 and a series of spaced apart frangible connection sections 190 that extend between the inner surface of outer ring 188 and the outer edges of chimney section plug structure 138c. Outer ring 188 overlies the portion of spout member end wall 72d located outwardly of spout member central opening 78d. Connection sections 190 have a convergent cross section in an outward-to-inward direction, such that a relatively small amount of material is operable to connect ring 188 with plug structure 138d. In use, the user is able to grasp ring 188 and lift it upwardly, which breaks connection sections 190 away from plug structure 138d. Such removal of tamper evident member 186 enables spout member 44d to be moved outwardly to its open position relative to chimney member 42d in the same manner as described previously, and provides a visual indication that spout member 44d may have been moved away from its initial closed position.

Alternatively, the user can simply leave tamper evident member 186 in place and rotate spout member 44d toward its open position. Upon application of an adequate force, this functions to sever the connection between connection sections 190 and plug structure 138d, to enable spout member 44d to be moved to its open position.

FIGS. 40–43 show a mold arrangement for forming the components of container closure assembly 40d, and like reference characters will be used where possible to facilitate clarity. In this version, first mold section 92d includes outer mold block 96d and core 102d. Second mold section 94d is in the form of a one-piece member, and cooperates with outer mold block 96d and core 102d so as to form mold surfaces having a configuration corresponding to the configuration of spout member 44d. If desired, first and second mold sections 92d, 94d may include inserts in cores similar to sleeve 100, insert 110 and core 112 of FIGS. 9 and 10 so as to form stop members, similar to stop member 74, on spout member 44d and recesses, similar to recesses 66 and 68, on chimney member 42d. Core 102d of first mold section 94d has a raised central area 194 and depending radially spaced apart projections 196 which extend downwardly from central area 194. The central area of second mold section 94d is formed with a configuration that matches central area 194 and projections 196, so as to define an inner lip area 198 that borders spout member opening 78d upon formation of spout member 44d. A spout end wall void area 200 extends outwardly from the upper end of lip void area 198, to form spout member end wall 72d.

Figure 42:
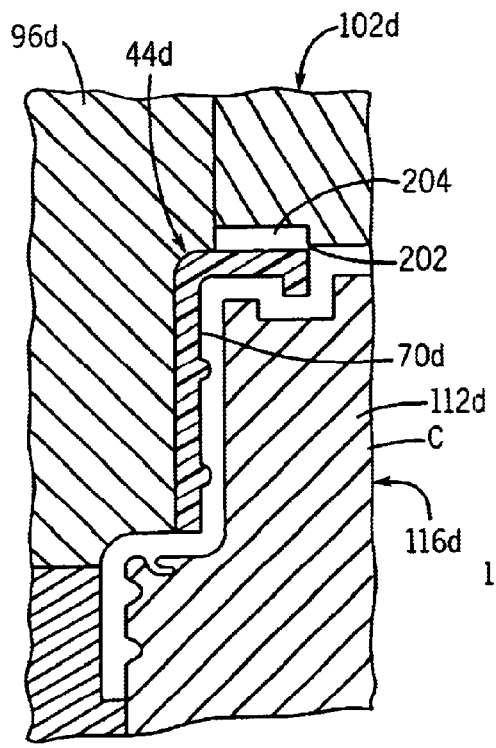
FIGS. 42 and 43 are section views illustrating molding of the chimney member and tamper evident member incorporated into the container closure assembly of FIG. 37.
Figure 43:
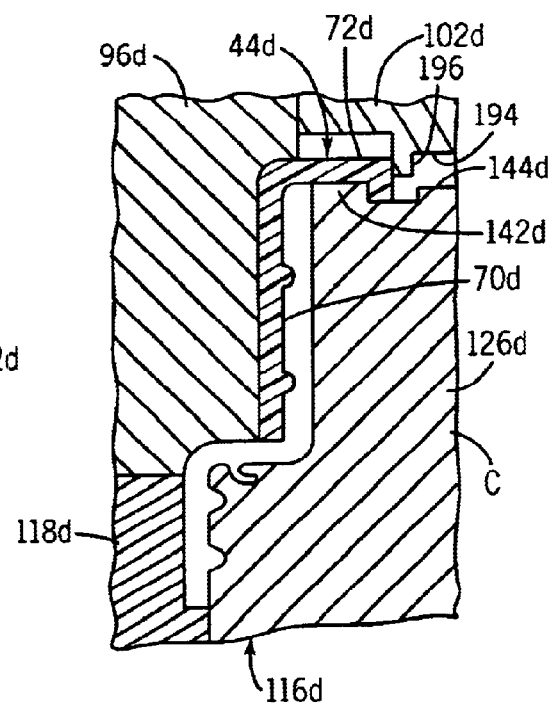

After formation of spout member 44d, second mold section 94d is removed and replaced with third mold section 116d, and core 102d of first mold section 92d is moved to a retracted position, as shown in FIGS. 42 and 43. Core 112d of third mold section 116d includes projections 142d to form chimney member openings 64d, as well as a recess surface 144d which forms plug structure 138d.

Central area 194 and projections 196 of core 102d cooperate with recess surface 144d to form plug structure 138d of chimney member 42d. In addition, projections 196 and central area 194 are configured to define a series of gate areas or passages 202, that communicate between the plug structure void and a tamper evident member void area 204 that overlies spout member end wall 72d. Gate areas 202 are configured so as to correspond to connection sections 190. In this manner, injection of moldable material into the mold cavity defined by first and third mold sections 102*d*, 116*d*, respectively, functions to form connection sections 190 integrally between plug structure 138*d* and tamper evident member 186, which is formed in void area 204.

Again, the above construction provides the combined advantages of sequentially forming spout member 44*d* and chimney member 42*d* together as described previously, and incorporates a tamper evident feature without significant additional tooling costs or complexity.

In all of the molding arrangements as shown and described, movement of the various mold sections and components is axial and not transverse, which simplifies production, operation and maintenance of the various mold components.

The sequential forming of the spout member and chimney member components is carried out in a bi-injection molding process in which there is a translational portion of the mold. The translational portion of the mold has multiple faces with the same features on each face. In the illustrated embodiment, the translational mold portion is provided with the necessary recesses and structures to form the spout member. At each cycle of the molding machine, each mold face moves to a different station or location for carrying out the various steps in the molding process.

In one embodiment, the translational portion of the mold is moved in a rotational manner, commonly designated as a spin stack molding process, as shown and described in WIPO published patent application WO 98/35808, which involves use of two parallel parting lines located one behind the other. Molding surfaces on one of the parting lines are operable to form spout 44, and molding surfaces on the other parting line are operable to form chimney member 42. The translation between the two parting lines is effected by rotating the common section of the mold (first mold section 92) about a vertical center line. The common section of the mold typically has four faces, each of which contains multiple cavities and inserts for forming the various surfaces of spout member 44.

In operation, the multiple spout members 44 are formed in the first molding cycle (FIG. 9) using the molding surfaces on the common mold section, i.e. first mold section 92, and the stationary mold section, i.e. second mold section 94, at the first parting line location. At the second molding cycle, the common mold section (first mold section 92) is rotated 90° and the spout members 44 formed at the first mold station are allowed to cool. If desired, additional molding techniques can be employed at this time, such as in-mold decorating or insert molding. Between the first and third molding cycles, the retractable portion 130 of sleeve 100 is moved to its retracted position. In the third molding cycle, the common mold section (first mold section 92) is rotated another 90° and chimney member 42 is molded using a stationary mold section, i.e. third mold section 116. The molding surfaces for the chimney member 42 include the common mold section molding surfaces for spout member 44, the cooled surfaces of spout member 44, the retractable insert molding surface of sleeve retractable section 130, and the surfaces of third mold section 116 at the second parting line location. In the fourth molding cycle, the common mold section is rotated another 90° and chimney member 42 is allowed to cool. Chimney member 42 and the attached spout member 44 may be ejected or removed from the mold, in a manner as is known, at the end of the third molding cycle or during the fourth molding cycle. The retractable portion 130 of sleeve 100 is returned to its extended position between the third and first molding cycles.

In an alternative form, the common mold section may be rotational and the basic mold structure is that of a "turntable" or "swing plate" mold, as shown in WIPO published patent application WO 98/38021, which involves a single parting line. The non-rotating half of the mold is divided in half, with the molding surfaces for the spout member on one half and the molding surfaces for the chimney member on the other. The turntable portion of the mold is divided into quadrants, with the same molding surfaces on each quadrant. The translation between each quadrant is effected by rotating the turntable 90° about its horizontal center line at each molding cycle. The turntable includes retractable inserts such as 100, which have molding surfaces for forming a portion of the spout stop members and the portion of the chimney member flange areas which define the recesses within the spout stop members are located. The steps involved in this type of molding system are similar to the steps as described above.

In yet another alterative form, the translational movement of the common mold section is linear rather than rotational, and the basic mold structure is that of a shuttle mold involving a single parting line. The linear movement can be horizontal, vertical or diagonal. The non-shuttle half of the mold is divided into three or four zones. The first zone has the spout member molding surfaces, the second zone is blank, the third zone has the chimney member molding surfaces and the fourth zone (which is optional) is blank. The shuttle half of the mold is divided into four zones with the same molding surfaces in each zone. The translation between each zone is effected by linear movement of the shuttle at each molding cycle. Each shuttle zone includes a sleeve with a retractable section similar to 130. In operation, the multiple spout members 44 are formed in the first molding cycle using the molding surfaces zone of the non-shuttle half of the mold, in which the retractable insert section is in its extended position. At the second molding system, the shuttle is indexed to the next zone and the formed spout members 44 are allowed to cool. If desired, additional molding techniques can be employed at this time, such as in-mold decorating or insert molding. Between the first and third molding cycles, the retractable section is moved from its extended position to its retracted position. In the third molding cycle, the shuttle is indexed to the next zone and the chimney member 42 is molded. The molding surfaces for the chimney member 42 include the shuttle cavity molding surfaces for the chimney member, the cooled surfaces of the spout member, the retracted surfaces of the sleeve retractable section, and the body molding surfaces of the non-shuttle half of the mold. In the optional fourth molding cycle, the shuttle is indexed to the next zone and the chimney member is allowed to cool. The chimney member and the attached spout member may be ejected or removed from the mold, in a manner as is known, at the end of the third molding cycle or during the fourth molding cycle. If the assembly is ejected at the end of the third molding cycle, then the fourth cycle is not needed. The retractable sleeve section is returned to its extended position between the third and first molding cycles.

In another alternative molding process, molding can take place in two cycles instead of four by using combinations of moldable material which do not require a cooling period between molding of the spout member and molding of the chimney member, which is otherwise required to prevent the spout member and the chimney member from becoming bonded together.

It can thus be appreciated that the closure assembly of the present invention possesses numerous advantages over the prior art. The spout member and the chimney member are formed so as to be in an overlapping closed relationship, in a sequential molding process. This reduces the number of separate mold sections required to form the components of the closure assembly, by utilizing surfaces of the spout member as mold surfaces when forming the chimney member. The forming of openings in the chimney member by using structure associated with the spout member ensures a tight fit and an effective seal between the spout member and the chimney member.

While the invention has been shown and described in connection with a spout-type closure assembly, it is contemplated that the invention can be employed to form any two-piece assembly in which a first component and a second component are adapted to be assembled together and movable relative to each other between open and closed positions.

In addition, while the invention has been shown and described with respect to a particular embodiment, it is understood that various alternatives and modifications are possible without departing from the scope and spirit of the present invention. For example, the drawings illustrate axial outward movement of the spout member relative to the chimney member for placing the spout member in its open position. It is also contemplated that the spout member may be movable between its open and closed positions simply by rotational movement relative to the chimney member, wherein chimney member openings and spout member openings are aligned with each other when the spout member is in its open position, and wall portions of the chimney member overly and close the openings of the spout member when the spout member is in its closed position. In addition, while the rotational version with integral stop structure has been shown and described with respect to a stop member formed on the spout member side wall and located within a recess defined by the chimney member, it is also contemplated that the recess may be associated with the spout member and stop members associated with wall structure of the chimney member. Further, while the spout member has been shown and described as being mounted to structure defined as a "chimney member", it is understood that the spout member may be mounted to any type of structure that is formed inside the spout member and which defines a passage or cavity adapted to be opened and closed by the spout member.

Various alternatives and embodiments are contemplated as being within the scope of the following claims particularly pointing out and distinctly claiming the subject matter regarded as the invention.

I claim:

1. A method of forming a two-piece container closure assembly having a chimney member and a spout member, comprising the steps of:

forming the spout member in a first mold cavity defined by first and second mold sections by injecting moldable material into the first mold cavity, wherein the first mold cavity is configured such that the spout member includes a side wall defining an internal passage having an open inner end, an outer end wall spaced from the open inner end, and one or more spout member openings in communication with the internal passage;

maintaining the spout member in engagement with the first mold section and removing the second mold section;

forming a second mold cavity by positioning a third mold section in engagement with the first mold section, wherein the third mold section cooperates with the first mold section and the spout member to form a second mold cavity configured to correspond to the chimney member; and forming the chimney member by injecting moldable material into the second mold cavity.

2. The method of claim 1, wherein the spout member is formed such that the one or more spout member openings are formed in the outer end wall of the spout member.

3. The method of claim 1, wherein the third mold section cooperates with the first mold section and the spout member to define a base section cavity portion and a chimney section cavity portion for the second mold cavity, such that injection of moldable material into the second mold cavity functions to form the chimney member with a base section and a chimney section, wherein the base section is adapted for engagement with a container.

4. The method of claim 3, wherein the third mold section includes a chimney core section that extends through the open inner end and into the internal passage of the spout member, wherein the chimney core section includes one or more side surfaces spaced inwardly from inner surfaces defined by the side wall of the spout member, and an end surface spaced inwardly from an inner surface defined by the end wall of the spout member, which cooperate to form a chimney section cavity portion of the second mold cavity within which the chimney section of the chimney member is formed.

5. The method of claim 4, wherein the first mold section includes opening-forming structure which cooperates with the second mold section to form the one or more spout member openings in the outer end wall of the spout member, wherein the opening-forming structure of the first mold section remains within the one or more spout member openings when the second mold section is removed and the third mold section is positioned in engagement with the first mold section, and wherein the chimney core section of the third mold section defines an end surface spaced inwardly from the opening-forming structure of the first mold section such that the chimney core section end surface, the end wall of the spout member and the opening-forming structure of the first mold section function to define a mold space that overlies the one or more spout member openings in the end wall of the spout member within which an end wall of the chimney section is formed, such that the spout member and the chimney section are separately formed in a manner in which the chimney section end wall closes the one or more spout member openings.

6. The method of claim 5, wherein the chimney core section of the third mold section includes opening-forming structure that engages one or more inner surface areas of the spout member end wall so as to form one or more openings in the spout member end wall.

7. The method of claim 1, wherein the first and second mold cavities are configured so as to form movement-limiting structure between the chimney member and the spout member.

8. The method of claim 7, wherein the first and second mold cavities are configured to form mating helical engagement structure between the spout member and the chimney member, for providing translational inward and outward movement of the spout member upon rotation of the spout member relative to the chimney member, and wherein the movement-limiting structure comprises stop member and recess structure associated with the spout member and the chimney member, wherein engagement of the stop member with at least one end of the recess is operable to limit rotational movement of the spout member relative to the chimney member, to thereby prevent further rotational movement of the spout member relative to the chimney member and resultant translational movement of the spout member relative to the chimney member.

9. The method of claim 8, wherein the stop member is formed on the side wall of the spout member and wherein the recess is defined by a base section of the chimney member, and wherein the chimney member further includes a chimney section extending from the base section and wherein the mating helical engagement structure is located between the side wall of the spout member and the chimney section of the chimney member.

10. The method of claim 1, wherein the spout member is movable relative to the chimney member for movement between an open position and a closed position, wherein the spout member and the chimney member are formed such that the spout member is initially in its closed position when the spout member and the chimney member are formed, and further comprising the step of forming a frangible tamper evident member integrally with one of the chimney member and the spout member which is engageable with the spout member for maintaining the spout member in its initial closed position, wherein the tamper evident member is removable so as to enable the spout member to be moved to its open position and to provide a visual indication as to movement of the spout member away from its initial closed position.

11. A method of forming a two-piece container closure assembly having a chimney member and a spout member, comprising the steps of:
    positioning first and second mold sections together, wherein the first and second mold sections cooperate to define a first cavity having a side wall portion and an end wall portion;
    injecting moldable material into the first cavity to form a spout member having an end wall and a side wall which cooperate to form an internal cavity, wherein the first and second mold sections are configured to form an opening in at least one of the side wall portion and the end wall portion of the spout member;
    removing the second mold section while maintaining the spout member in engagement with the first mold section;
    positioning a third mold section in engagement with the first mold section, wherein the first and third mold sections cooperate with the spout member to define a second cavity having a base portion and a chimney portion, wherein the chimney portion of the second cavity is defined in part by inner surface areas of the spout member end wall and side wall; and
    injecting moldable material into the second cavity to form a chimney member having a base section and a chimney section, wherein the second cavity is configured to form an opening in the chimney section when the moldable material is injected into the second cavity;
    wherein the second cavity is further configured such that, during formation of the chimney member, the opening in the chimney section is closed by the material of the spout member and the opening in the spout member is closed by the material of the chimney member.

12. The method of claim 11, wherein the spout member and the first and third mold sections are configured to form the chimney portion of the second cavity with a chimney side wall section and a chimney end wall section, wherein an outer surface of the chimney side wall section is defined by inner surface areas of the spout member side wall and wherein an outer surface of the chimney end wall section is defined by inner surface areas of the spout member end wall.

13. The method of claim 11, wherein the spout member and the first and third mold sections are configured to form the chimney portion of the second cavity with a chimney side wall section and a chimney end wall section, wherein an outer surface of the chimney side wall section is defined by inner surface areas of the spout member side wall and wherein an outer surface of the chimney end wall section is defined by inner surface areas of the spout member end wall.

14. The method of claim 13, wherein the first cavity is configured such that the opening in the spout member is formed in the spout member end wall and wherein the second cavity is configured such that the opening in the chimney section is formed in an end wall of the chimney member formed by injecting moldable material into the chimney end wall section of the second cavity.

15. The method of claim 14, wherein the first and second mold cavities are configured to form mating engagement structure between the chimney member end wall and the spout member end wall during formation of the spout member and the chimney member, respectively, wherein the mating engagement structure is configured to isolate the opening in the spout member end wall from the opening in the chimney end wall.

16. The method of claim 15, wherein the chimney member is formed within the internal cavity of the spout member such that the spout member is in a closed position relative to the chimney member, and wherein, when the spout member and chimney member are removed from the second mold cavity, the spout member is movable relative to the chimney member to an open position for establishing communication between the spout member opening and the chimney member opening.

17. The method of claim 16, further comprising the step of forming a stop arrangement between the spout member and the chimney member for limiting movement of the spout member relative to the chimney member.

18. The method of claim 17, wherein the spout member is axially movable relative to the chimney member, and wherein the stop arrangement comprises a ring and groove arrangement molded between the outer surface of the chimney member side wall and the inner surface of the spout member side wall, wherein the ring and groove arrangement is configured to stop axial movement of the spout member in its closed position and in its open position.

19. The method of claim 17, wherein the spout member is rotationally and axially movable relative to the chimney member, and wherein the stop arrangement comprises a recess and stop member arrangement interposed between the chimney member and the spout member side wall, wherein the recess defines radially spaced apart ends and wherein engagement of the stop member with the ends of the recess is operable to control rotational movement of the spout member relative to the chimney member between the open and closed positions of the chimney member.

20. The method of claim 19, wherein the spout member is movable relative to the chimney member by forming mating helical threads between the spout member side wall and the chimney member side wall for providing combination rotational and axial movement of the spout member relative to the chimney member between its open and closed positions, wherein the recess and stop member arrangement is configured to provide engagement between the spout member and the chimney member so as to limit axial outward movement of the spout member relative to the chimney member.

21. The method of claim 11, further comprising the step of forming a tamper evident member interconnected with one of the chimney member and the spout member by a frangible connection arrangement, wherein the frangible connection arrangement is operable to separate the tamper evident member to enable initial movement of the spout member away from its closed position subsequent to formation of the chimney member and the spout member.

22. A method of forming a two-piece container closure assembly having a chimney member and a spout member, comprising the steps of:
  positioning first and second mold sections together, wherein the first and second mold sections cooperate to define a first cavity having a side wall portion and an end wall portion;
  injecting moldable material into the first cavity to form a spout member having an end wall and a side wall which cooperate to form an internal cavity, wherein the first and second mold sections are configured to form an opening in the spout member;
  removing the second mold section while maintaining the spout member in engagement with the first mold section;
  positioning a third mold section in engagement with the first mold section, wherein the first and third mold sections cooperate with the spout member to define a second cavity having a base portion and a chimney portion, wherein the chimney portion of the second cavity is defined in part by inner surface areas of the spout member end wall and side wall; and
  injecting moldable material into the second cavity to form a chimney member having a base section and a chimney section, wherein the second cavity is further configured to form an opening in the chimney section when the moldable material is injected into the second cavity;
  wherein the spout member and the first and third mold sections are configured to form the chimney portion of the second cavity with a chimney side wall section and a chimney end wall section, wherein an outer surface of the chimney side wall section is defined by inner surface areas of the spout member side wall and wherein an outer surface of the chimney end wall section is defined by inner surface areas of the spout member end wall;
  wherein the first cavity is configured such that the opening in the spout member is formed in the spout member end wall and wherein the second cavity is configured such that the opening in the chimney section is formed in an end wall of the chimney member formed by injecting moldable material into the chimney end wall section of the second cavity.

23. The method of claim 22, wherein the first and second mold cavities are configured to form mating engagement structure between the chimney member end wall and the spout member end wall during formation of the spout member and the chimney member, respectively, wherein the mating engagement structure is configured to isolate the opening in the spout member end wall from the opening in the chimney end wall.

24. The method of claim 23, wherein the chimney member is formed within the internal cavity of the spout member such that the spout member is in a closed position relative to the chimney member, and wherein, when the spout member and chimney member are removed from the second mold cavity, the spout member is movable relative to the chimney member to an open position for establishing communication between the spout member opening and the chimney member opening.

25. The method of claim 24, further comprising the step of forming a stop arrangement between the spout member and the chimney member for limiting movement of the spout member relative to the chimney member.

26. The method of claim 25, wherein the spout member is axially movable relative to the chimney member, and wherein the stop arrangement comprises a ring and groove arrangement molded between the outer surface of the chimney member side wall and the inner surface of the spout member side wall, wherein the ring and groove arrangement is configured to stop axial movement of the spout member in its closed position and in its open position.

27. The method of claim 25, wherein the spout member is rotationally and axially movable relative to the chimney member, and wherein the stop arrangement comprises a recess and stop member arrangement interposed between the chimney member and the spout member side wall, wherein the recess defines radially spaced apart ends and wherein engagement of the stop member with the ends of the recess is operable to control rotational movement of the spout member relative to the chimney member between the open and closed positions of the chimney member.

28. The method of claim 27, wherein the spout member is movable relative to the chimney member by forming mating helical threads between the spout member side wall and the chimney member side wall for providing combination rotational and axial movement of the spout member relative to the chimney member between its open and closed positions, wherein the recess and stop member arrangement is configured to provide engagement between the spout member and the chimney member so as to limit axial outward movement of the spout member relative to the chimney member.

29. A method of forming a two-piece container closure assembly having a chimney member and a spout member, comprising the steps of:
  positioning first and second mold sections together, wherein the first and second mold sections cooperate to define a first cavity having a side wall portion and an end wall portion;
  injecting moldable material into the first cavity to form a spout member having an end wall and a side wall which cooperate to form an internal cavity, wherein the first and second mold sections are configured to form an opening in the spout member;
  removing the second mold section while maintaining the spout member in engagement with the first mold section;
  positioning a third mold section in engagement with the first mold section, wherein the first and third mold sections cooperate with the spout member to define a second cavity having a base portion and a chimney portion, wherein the chimney portion of the second cavity is defined in part by inner surface areas of the spout member end wall and side wall;
  injecting moldable material into the second cavity to form a chimney member having a base section and a chimney section, wherein the second cavity is further configured to form an opening in the chimney section when the moldable material is injected into the second cavity; and
  forming a tamper evident member interconnected with one of the chimney member and the spout member by a frangible connection arrangement, wherein the frangible connection arrangement is operable to separate the tamper evident member to enable initial movement of the spout member away from its closed position subsequent to formation of the chimney member and the spout member.

30. In a method of forming a container closure having a chimney member with a base section adapted for engagement with a container and a chimney section defining an opening, in combination with a spout member having an opening, wherein the spout member is movably mounted to the chimney member for movement between an open position for discharging the contents of the container through the chimney section opening and the spout member opening, and a closed position for preventing discharge of the container contents, the improvement comprising forming the spout member in a first mold cavity defined by first and second mold sections such that the spout member includes an end wall and side wall structure which cooperate to define an internal cavity, and such that the spout member includes an opening in at least one of the end wall and the side wall structure, and subsequently forming the chimney member in a second mold cavity formed by maintaining the spout member in engagement with the first mold section, removing the second mold section, and engaging a third mold section with the first mold section, wherein the second cavity is defined in part by inner surface areas of the spout member end wall and side wall structure, wherein the second cavity is configured to form an opening in the chimney member, and wherein the chimney member and the spout member are formed with the spout member in its closed position such that the spout member closes the opening in the chimney member and the chimney member closes the opening in the spout member.

31. The improvement of claim 30, wherein the second mold cavity is configured to form the chimney member with an end wall located adjacent the spout member end wall and a side wall located adjacent the spout member side wall structure, and wherein the spout member opening is formed in the spout member end wall and the chimney section opening is formed in the chimney member end wall, wherein the spout member end wall and the chimney member end wall include mating engagement structure which isolates the spout member opening from the chimney member opening when the spout member is formed in its closed position.

32. The improvement of claim 31, further comprising the step of forming a ring and groove arrangement between the chimney member side wall and the spout member side wall structure, wherein the ring and groove arrangement is configured so as to releasably maintain the spout member in the closed position and to provide a stop against axial movement of the spout member relative to the chimney member when the spout member is in its open position.

33. The improvement of claim 31, further comprising the step of forming a stop member and recess arrangement between the chimney member and the spout member side wall structure, wherein the stop member and recess arrangement includes an arcuate recess defining at least one end, and wherein the stop member is engageable with the end of the recess upon rotation of the spout member relative to the chimney member for positioning the spout member in its open position.

34. The improvement of claim 33, further comprising the step of forming helical engagement structure between the spout member side wall structure and the chimney member side wall for providing combined axial and rotational movement of the spout member relative to the chimney member.

35. The improvement of claim 30, further comprising the step of forming a tamper evident member integrally with one of the spout member and the chimney member, wherein the tamper evident member includes a frangible connection arrangement which maintains the spout member in its initial closed position, and which is separable in order to separate the tamper evident member for providing movement of the spout member away from its initial closed position relative to the chimney member.

36. The improvement of claim 35, wherein the spout member is formed with an opening in its end wall and wherein the chimney member includes an end wall having an opening, wherein the spout member opening and the chimney member opening are offset from each other when the spout member is in its closed position, and wherein the step of forming the tamper evident member is carried out by forming the tamper evident member integrally with the chimney member end wall, wherein the tamper evident member is located exteriorly of the spout member opening and in alignment with at least a portion of the spout member end wall.

37. The improvement of claim 35, wherein the chimney member is formed with a side wall and outer wall structure spaced radially outwardly from the chimney member side wall, and wherein the tamper evident member is formed integrally with the spout member and located outwardly of the outer wall structure of the chimney member, wherein the frangible connection arrangement extends through one or more spaces formed in the outer wall structure of the chimney member.

* * * * *